(12) United States Patent
Shimizu et al.

(10) Patent No.: US 12,343,799 B2
(45) Date of Patent: Jul. 1, 2025

(54) THREE-DIMENSIONAL MANUFACTURING APPARATUS

(71) Applicant: IHI CORPORATION, Tokyo (JP)

(72) Inventors: Riku Shimizu, Tokyo (JP); Yuichiro Nakayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 941 days.

(21) Appl. No.: 17/600,097

(22) PCT Filed: Mar. 30, 2020

(86) PCT No.: PCT/JP2020/014648
§ 371 (c)(1),
(2) Date: Sep. 29, 2021

(87) PCT Pub. No.: WO2020/203992
PCT Pub. Date: Oct. 8, 2020

(65) Prior Publication Data
US 2022/0161331 A1 May 26, 2022

(30) Foreign Application Priority Data
Apr. 2, 2019 (JP) .................... 2019-070690

(51) Int. Cl.
*B22F 12/37* (2021.01)
*B22F 12/41* (2021.01)
(Continued)

(52) U.S. Cl.
CPC .............. *B22F 12/37* (2021.01); *B22F 12/41* (2021.01); *B33Y 30/00* (2014.12); *B22F 10/28* (2021.01)

(58) Field of Classification Search
CPC .......... B22F 12/37; B22F 12/41; B22F 10/28; B22F 12/13; B22F 2999/00; B33Y 30/00;
(Continued)

(56) References Cited

U.S. PATENT DOCUMENTS 8,172,562 B2 * 5/2012 Mattes .................. B29C 64/153
425/375
9,468,973 B2 * 10/2016 Ljungblad ............. B22F 10/366
(Continued)

FOREIGN PATENT DOCUMENTS

| CN | 104769296 A | 7/2015 |
| CN | 107107469 A | 8/2017 |

(Continued)

*Primary Examiner* — Jessee R Roe
*Assistant Examiner* — Michael Aboagye
(74) *Attorney, Agent, or Firm* — Rothwell, Figg, Ernst & Manbeck, P.C.

(57) ABSTRACT

A three-dimensional manufacturing apparatus includes a rotary drive unit that rotates a table around a rotation axis, a region setting unit that sets a plurality of divided regions obtained by dividing an irradiation region, a beam source that irradiates a powder material with an electron beam for each of the divided regions, and a rotation speed adjusting unit that adjusts a rotation speed of the table. An area per unit central angle of a first divided region is smaller than an area per unit central angle of a second divided region. The rotation speed adjusting unit performs adjustment so that a rotation speed of the table during a period of irradiating the first divided region with the energy beam becomes faster than a rotation speed of the table during a period of irradiating the second divided region with the energy beam.

4 Claims, 13 Drawing Sheets

(51) Int. Cl.
*B33Y 30/00* (2015.01)
*B22F 10/28* (2021.01)

(58) Field of Classification Search
CPC ..... B33Y 50/02; B29C 64/153; B29C 64/241; B29C 64/245; B29C 64/393
USPC ............. 266/287; 425/78; 219/121.6, 121.61
See application file for complete search history.

(56) References Cited

U.S. PATENT DOCUMENTS

| | | | |
|---|---|---|---|
| 10,698,386 B2 * | 6/2020 | Roychowdhury | B33Y 30/00 |
| 10,786,865 B2 * | 9/2020 | Hellestam | B29C 64/245 |
| 11,524,338 B2 * | 12/2022 | Shinagawa | B22F 12/45 |
| 2006/0108712 A1 | 5/2006 | Mattes | |
| 2010/0233012 A1 | 9/2010 | Higashi et al. | |
| 2015/0219147 A1 | 8/2015 | Furuno | |
| 2016/0096319 A1 | 4/2016 | Donaldson et al. | |
| 2016/0167160 A1 | 6/2016 | Hellestam | |
| 2016/0167303 A1 | 6/2016 | Petelet | |
| 2017/0305138 A1 | 10/2017 | Donaldson et al. | |
| 2018/0345373 A1 | 12/2018 | Holford et al. | |
| 2020/0398341 A1 | 12/2020 | Hellestam | |

FOREIGN PATENT DOCUMENTS

| | | |
|---|---|---|
| CN | 108971487 A | 12/2018 |
| JP | 2005-534543 A | 11/2005 |
| JP | 2009-108348 A | 5/2009 |
| JP | 2016-74205 A | 5/2016 |
| JP | 2018-507957 A | 3/2018 |

* cited by examiner (a)

(b)

(c)

(a)

(b)

(a)

(b)

(a)

(b)

THREE-DIMENSIONAL MANUFACTURING APPARATUS

CROSS REFERENCE TO RELATED APPLICATIONS

This application is a 35 U.S.C. 371 National Phase Entry Application from PCT/JP2020/014648, filed Mar. 30, 2020, which claims priority to Japanese Patent Application No. 2019-70690, filed Apr. 2, 2019, the disclosures of which is incorporated herein in its entirety by reference, and priority is claimed to the each of the foregoing.

TECHNICAL FIELD

The present disclosure relates to a three-dimensional manufacturing apparatus.

BACKGROUND ART

Patent Literature 1 and Patent Literature 2 disclose a technology related to a three-dimensional modeling apparatus for modeling a modeled object. In the technology for modeling a modeled object disclosed in Patent Literature 1, an energy beam is irradiated onto a material applied to a rotating forming container. In the technology for modeling a modeled object disclosed in Patent Literature 2, a liquid is ejected from an inkjet in a printhead onto a material on a rotating table. The liquid is subjected to a printing process for curing.

CITATION LIST

Patent Literature

Patent Literature 1: Japanese Translation of PCT International Application Publication No. 2005-534543
Patent Literature 2: Japanese Unexamined Patent Publication No. 2016-74205

SUMMARY OF INVENTION

Technical Problem

For example, the three-dimensional modeling apparatus described in Patent Literature 1 sequentially irradiates a plurality of regions along a rotation direction of a table with an energy beam while rotating the table which is the forming container. As a result, each layer of the modeled object is stacked. A rotation speed of the table is set based on a time required to irradiate the plurality of regions on the table with the energy beam. The rotation speed of the table is set to a constant value, for example. However, the area of a cross section of the layer of the modeled object may differ for each region. As a result, the time required for irradiating the energy beam changes for each region according to the difference in area. In this case, the rotation speed of the table does not correspond to the change in the time required for the irradiation. Therefore, a loss of modeling time occurs.

The present disclosure describes a three-dimensional manufacturing apparatus capable of shortening a modeling time.

Solution to Problem

A three-dimensional manufacturing apparatus of the present disclosure models a three-dimensional modeled object by irradiating a powder material supplied onto a main surface of a table with an energy beam. The three-dimensional manufacturing apparatus includes a rotary drive unit that rotates the table about a rotation axis in a circumferential direction, a region setting unit that sets a plurality of divided regions obtained by dividing, in the circumferential direction, an irradiation region of the energy beam on the main surface of the table, the irradiation region corresponding to a cross section of the modeled object intersecting the rotation axis, an irradiation unit that faces the main surface of the table and irradiates the powder material with the energy beam for each of the divided regions, and a rotation speed adjusting unit that adjusts a rotation speed of the table. An area per unit central angle of a first divided region among the plurality of divided regions is smaller than an area per unit central angle of a second divided region among the plurality of divided regions. The rotation speed adjusting unit performs adjustment so that a rotation speed of the table during a period of irradiating the first divided region with the energy beam becomes faster than a rotation speed of the table during a period of irradiating the second divided region with the energy beam.

In the three-dimensional manufacturing apparatus, while the table rotates in the circumferential direction about the rotation axis, the powder material on the main surface of the table is sequentially irradiated with an energy beam for each of the divided regions. Here, the area per unit central angle of the first divided region is smaller than the area per unit central angle of the second divided region. Therefore, a time required to irradiate the area per unit central angle of the first divided region with the energy beam is shorter than a time required to irradiate the area per unit central angle of the second divided region with the energy beam. As a result, when the rotation speed of the table is set to a constant value based on a time required for the energy beam to the second divided region, a waiting time occurs after irradiation of the energy beam to the first divided region is completed before irradiation of the energy beam to the subsequent divided region is started. On the other hand, in the three-dimensional manufacturing apparatus, the rotation speed of the table during the period of irradiating the first divided region with the energy beam is adjusted to be faster than the rotation speed of the table during the period of irradiating the second divided region with the energy beam. In this way, by increasing the rotation speed of the table when irradiating the first divided region with the energy beam, the above-mentioned waiting time can be reduced. Therefore, the modeling time of the modeled object can be shortened.

In some aspects, a first central angle of the first divided region and a second central angle of the second divided region may be different values. For example, the first central angle of the first divided region is increased, and the second central angle of the second divided region is decreased. As a result, it is possible to increase a proportion of the first divided region in the irradiation region, and to decrease a proportion of the second divided region in the irradiation region. In this way, it is possible to shorten a time required for the table to make one rotation by increasing the proportion of the first divided region in which the rotation speed of the table is high. Therefore, according to the configuration, it is possible to further shorten the modeling time of the modeled object.

In some aspects, the region setting unit may include a phase difference adjusting unit that adjusts a phase difference which is a rotation angle indicating a difference between a reference line intersecting the rotation axis on the main surface of the table and a dividing line defining a central angle of the second divided region in the circumferential direction. The phase difference adjusting unit may set the phase difference of the second divided region after adjustment to a different value from a value of the phase difference of the second divided region before adjustment, and a central angle of the second divided region may be the same value before and after adjustment by the phase difference adjusting unit. In this way, it is possible to decrease the area per unit central angle of the second divided region by adjusting the phase difference of the second divided region. Accordingly, it is possible to shorten a time required for the energy beam to the area per unit central angle of the second divided region. As a result, it is possible to increase the rotation speed of the table during the period of irradiating the second divided region with the energy beam, and thus it is possible to further shorten the modeling time of the modeled object.

Effects of Invention

According to some aspects of the present disclosure, a three-dimensional manufacturing apparatus capable of shortening a modeling time is provided.

DESCRIPTION OF EMBODIMENTS

Hereinafter, a three-dimensional (3D) manufacturing apparatus 1 of the present disclosure will be described with reference to the drawings. It should be noted that in the description of the drawings, the same elements are designated by the same reference symbols. Further, a duplicate description will be omitted. In the following description, the words "upper" and "lower" are used with reference to a state in which a rotation axis C (see FIG. 1) of a table 12, which will be described later, is along a vertical direction. The word "lower" refers to a ground side in the vertical direction in the state in which the rotation axis C is along the vertical direction. The word "upper" refers to an opposite side from a ground in the vertical direction in the state in which the rotation axis C is along the vertical direction. A "circumferential direction" refers to a direction along a ring centered on the rotation axis C of the table 12. The "circumferential direction" refers to a direction including a rotation direction R (see FIG. 2) of the table 12.

Figure 1:
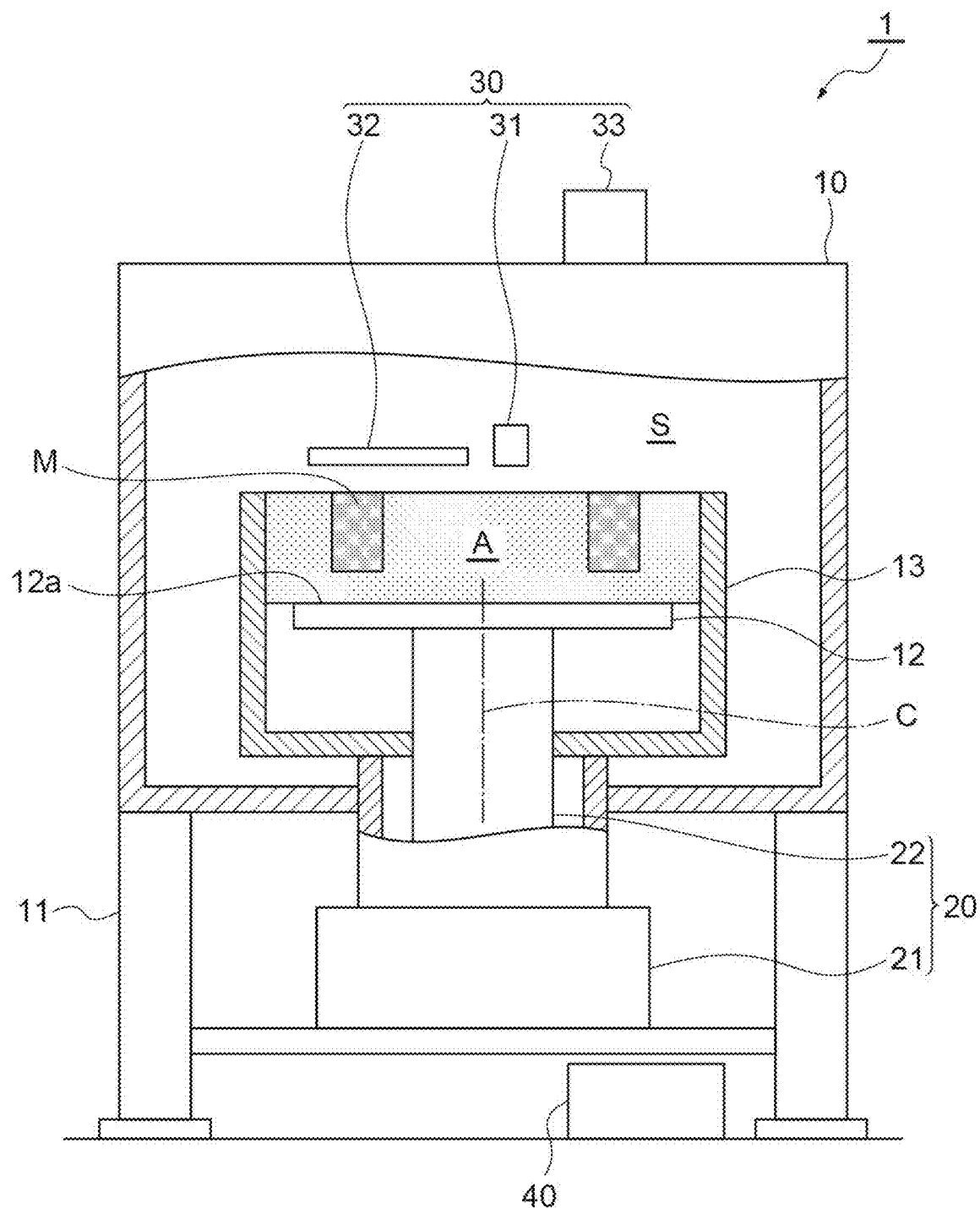
FIG. 1 is a cross-sectional view illustrating a three-dimensional manufacturing apparatus according to an embodiment.

The 3D manufacturing apparatus 1 illustrated in FIG. 1 is a so-called 3D printer. The 3D manufacturing apparatus 1 manufactures a 3D modeled object M from a powder material A. For example, the 3D manufacturing apparatus 1 melts or sinters the powder material A by irradiating the powder material A with an energy beam. As a result, the 3D modeled object M is modeled. The 3D manufacturing apparatus 1 adopts a powder bed method. In the powder bed method, the spread powder material A is irradiated with an electron beam for modeling.

The powder material A is metal powder. The powder material A is, for example, titanium-based metal powder, inconel powder, aluminum powder, etc. The powder material A is not limited to the metal powder. The powder material A may be, for example, resin powder. The powder material A may be powder containing carbon fibers such as carbon fiber reinforced plastics (CFRP). The powder material A may be powder containing a resin. The powder material A may be other electrically conductive powder. It should be noted that the powder material A in the present disclosure is not limited to the electrically conductive powder. For example, when a laser is used as the energy beam, the powder material A does not have to be electrically conductive.

The 3D manufacturing apparatus 1 includes a housing 10, a drive unit 20, a processing unit 30, and a controller 40. The housing 10 is supported by a plurality of columns 11. The housing 10 is a chamber that forms a modeling space S. The modeling space S accommodates the powder material A. The modeling space S is a space for processing the powder material A by the processing unit 30. The modeling space S can be depressurized and can be kept airtight. In the modeling space S, the table 12 and a modeling tank 13 accommodating the table 12 are disposed. The table 12 is a processing table on which a modeling process is performed. A shape of the table 12 is, for example, a disc. The powder material A, which is a raw material of the modeled object M, is disposed on a main surface 12a of the table 12. It can be considered that the main surface 12a of the table 12 is a modeling surface or an upper surface. The table 12 is rotatable with respect to the housing 10. The rotation axis C of the table 12 overlaps with a central axis of the housing 10. The rotation axis C may be along a downward direction. In other words, the rotation axis C may be along the vertical direction.

The drive unit 20 is connected to the table 12. The drive unit 20 implements various operations required for modeling. The drive unit 20 has, for example, a rotary drive unit 21 and a linear drive unit 22. The rotary drive unit 21 rotates the table 12 in the circumferential direction around the rotation axis C. For example, the table 12 is coupled to an upper end of the rotary drive unit 21. A drive source such as an electric motor is attached to a lower end of the rotary drive unit 21. The linear drive unit 22 raises and lowers the table 12 relative to the modeling tank 13. This raising and lowering is along the rotation axis C of the rotary drive unit 21. Therefore, the table 12 is rotated around the rotation axis C and linearly moved along the rotation axis C by the drive unit 20. It should be noted that the drive unit 20 may be any mechanism that can rotate and raise and lower the table 12, and is not limited to the mechanism described above.

Figure 2:
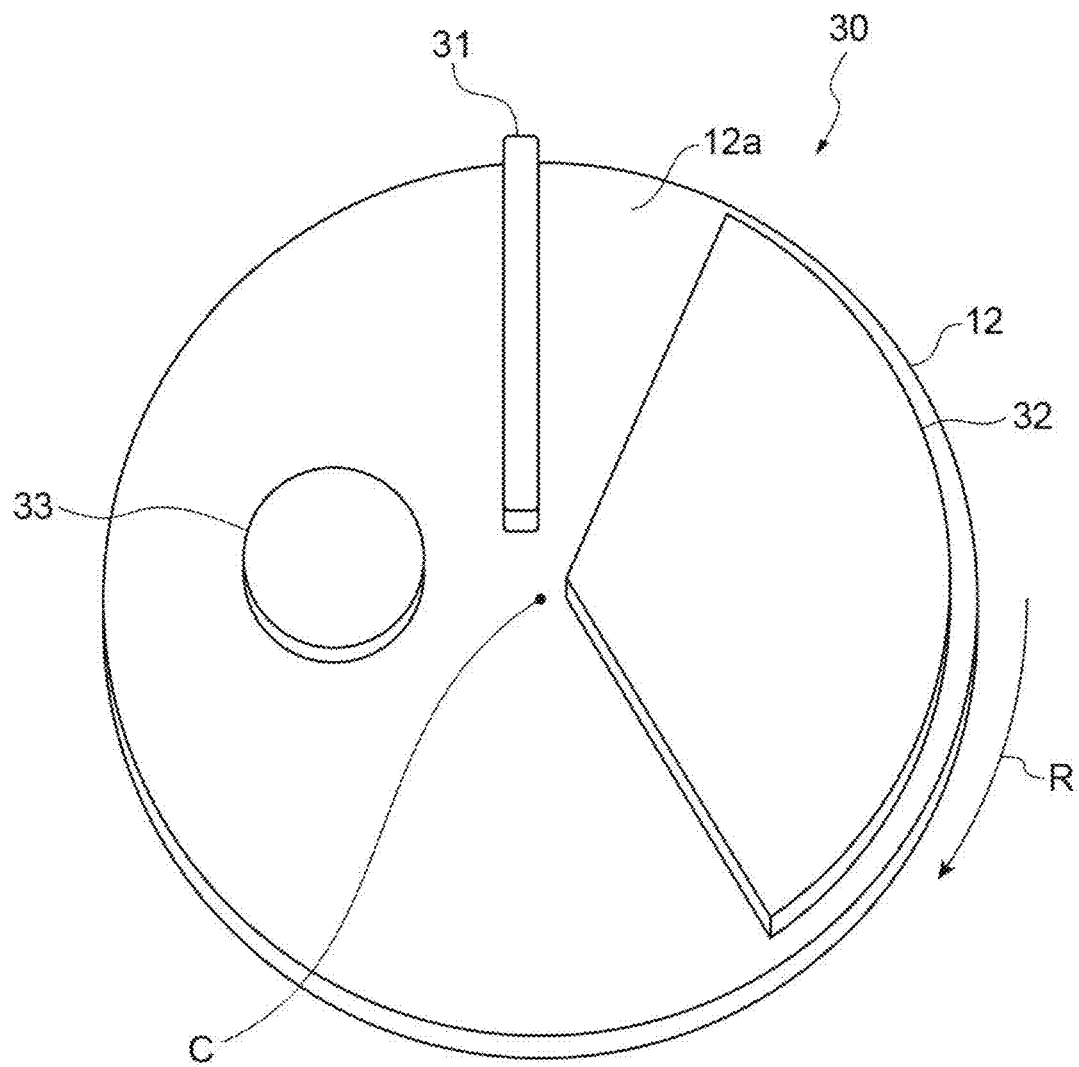
FIG. 2 is a configuration diagram illustrating a processing unit included in the three-dimensional manufacturing apparatus of FIG. 1.

The processing unit 30 processes the powder material A to obtain the modeled object M. Processes for the powder material A include, for example, a supply process of the powder material A, a preheat process (preliminary heat process) of the powder material A, and a modeling process of the powder material A. The processing unit 30 is disposed above the table 12. The processing unit 30 faces the main surface 12a of the table 12. As illustrated in FIG. 2, the processing unit 30 includes, for example, a feeder 31 that performs the supply process of the powder material A, a heater 32 that performs the preheat process of the powder material A, and a beam source 33 that performs the modeling process of the powder material A. The feeder 31, the heater 32, and the beam source 33 are disposed along the rotation direction R of the table 12.

The feeder 31 is a supply unit that supplies the powder material A onto the main surface 12a of the table 12. For example, the feeder 31 has a raw material tank and a leveling portion (not illustrated). The raw material tank stores the powder material A. The raw material tank supplies the powder material A onto the main surface 12a of the table 12. The leveling portion levels the surface of the powder material A on the table 12. It should be noted that the feeder 31 may have a roller portion, a rod-shaped member, a brush portion, etc. instead of the leveling portion.

The heater 32 is a heating unit that preheats the powder material A supplied onto the main surface 12a of the table 12. The heater 32 preheats the powder material A before being irradiated with the electron beam. For example, the heater 32 is disposed above the table 12. The heater 32 raises the temperature of the powder material A by radiant heat. For example, an infrared heater may be used as the heater 32. The heater 32 may perform heating using another method.

The beam source 33 emits the electron beam. The beam source 33 is an irradiation unit that irradiates the powder material A with the electron beam. For example, an electron gun is used as the beam source 33. The beam source 33 generates the electron beam according to a potential difference generated between a cathode and an anode. The beam source 33 converges the electron beam by adjusting an electric field. The beam source 33 irradiates a desired position with the electron beam.

According to the arrangement of the feeder 31, the heater 32 and the beam source 33 along the rotation direction R of the table 12 and the molding for rotating the table 12, the process of supplying the powder material A onto the main surface 12a of the table 12, the preliminary heat process of the powder material A, and the modeling process by beam irradiation can be performed in parallel. That is, supply of the powder material A at the position of the feeder 31, preheating of the powder material A at the position of the heater 32, and beam irradiation at the position of the beam source 33 are performed at the same timing. As a result, the modeled object M is modeled. Therefore, the modeling time of the modeled object M can be shortened when compared to the case where supply of the powder material A, preheating of the powder material A, and beam irradiation are sequentially performed. In particular, it is effective when modeling a large modeled object M.

The controller 40 illustrated in FIG. 1 controls the entire 3D manufacturing apparatus 1. The controller 40 includes, for example, a CPU that executes a program, a storage unit such as a ROM and a RAM, an input/output unit, and a driver. A plurality of functions of the controller 40 is implemented by operating the input/output unit under the control of the CPU and reading and writing data to and from the storage unit. A form and an arrangement location of the controller 40 are not particularly limited. The controller 40 is electrically connected to the drive unit 20 and the processing unit 30. The controller 40 performs rotation control and raising/lowering control on the table 12, operation control on the feeder 31, operation control on the heater 32, operation control on the beam source 33, etc.

Figure 3:
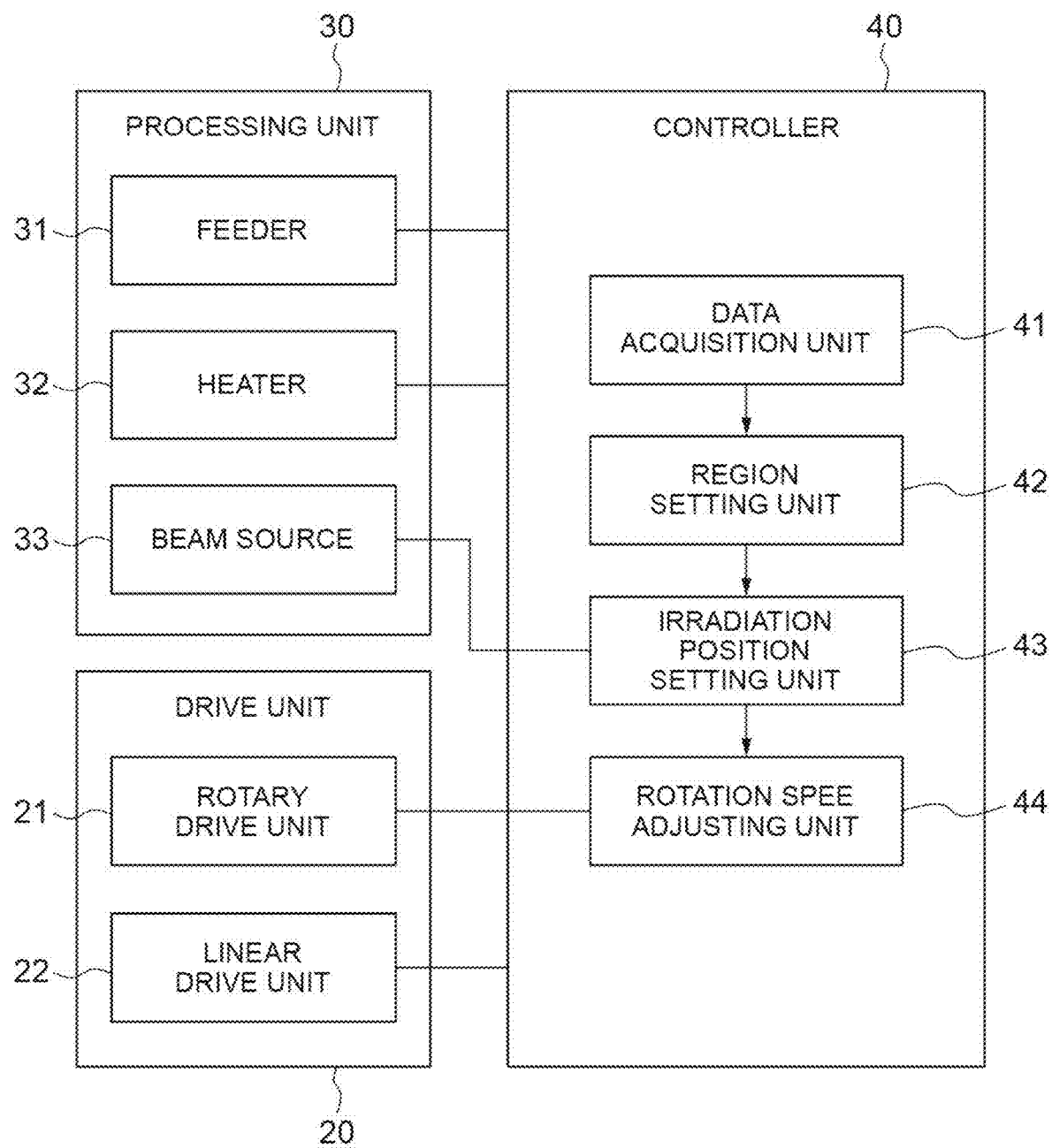
FIG. 3 is a block diagram illustrating a controller included in the three-dimensional manufacturing apparatus of FIG. 1.

As illustrated in FIG. 3, the controller 40 is electrically connected to the rotary drive unit 21 of the drive unit 20. The controller 40 outputs a control signal to the rotary drive unit 21 to control rotation of the table 12 through the operation of the rotary drive unit 21. For example, the controller 40 operates the rotary drive unit 21. As a result, the table 12 rotates about the rotation axis C in the rotation direction R. The rotation speed of the table 12 is adjusted by a rotation speed adjusting unit 44, which will be described later.

The controller 40 is electrically connected to the linear drive unit 22 of the drive unit 20. The controller 40 outputs a control signal to the linear drive unit 22. As a result, raising and lowering of the table 12 are controlled through the operation of the linear drive unit 22. For example, the controller 40 raises and lowers the table 12 by operating the linear drive unit 22. Specifically, the controller 40 disposes the table 12 at a position in an upper part of the modeling tank 13 at an initial stage of modeling. Then, the controller 40 lowers the table 12 as the modeling of the modeled object M progresses. A lowering speed of the table 12 may be determined according to, for example, the rotation speed of the table 12.

The controller 40 is electrically connected to the feeder 31 of the processing unit 30. The controller 40 outputs a control signal to the feeder 31. As a result, supply of the powder material A is controlled. For example, the controller 40 operates the feeder 31. As a result, the powder material A is supplied onto the main surface 12a of the table 12. A surface layer of the powder material A on the table 12 is spread as the table 12 rotates.

The controller 40 is electrically connected to the heater 32 of the processing unit 30. The controller 40 outputs a control signal to the heater 32. As a result, preheating of the powder material A is controlled. For example, the controller 40 operates the heater 32. As a result, the powder material A on the main surface 12a of the table 12 is heated, so that the powder material A is preheated. The amount of heat given to the powder material A may be set according to the quality and type of the powder material A, the rotation speed of the table 12, etc.

The controller 40 is electrically connected to the beam source 33 of the processing unit 30. The controller 40 outputs a control signal to the beam source 33. As a result, emission of the electron beam is controlled. For example, the controller 40 operates the beam source 33. As a result, an electron beam is generated, so that a predetermined position of the powder material A is irradiated with the electron beam. The position irradiated with the electron beam is a region where the modeled object M needs to be modeled. A preset irradiation position is irradiated with the electron beam. The irradiation position is set by an irradiation position setting unit 43, which will be described later.

Figure 4:
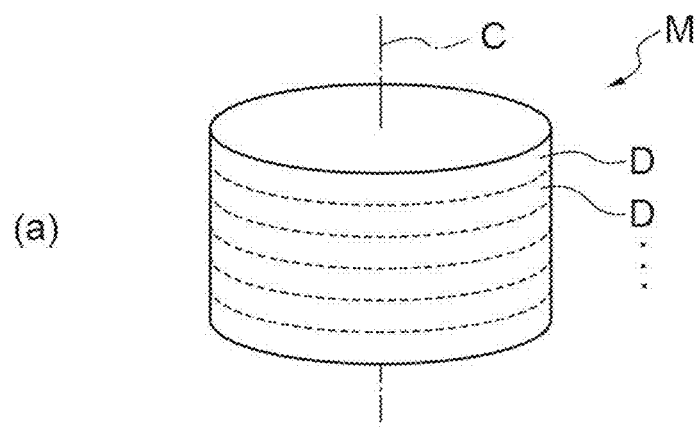
FIGS. 4(a), 4(b), and 4(c) are diagrams for description of a processing procedure in the controller of FIG. 3.
Figure 4:
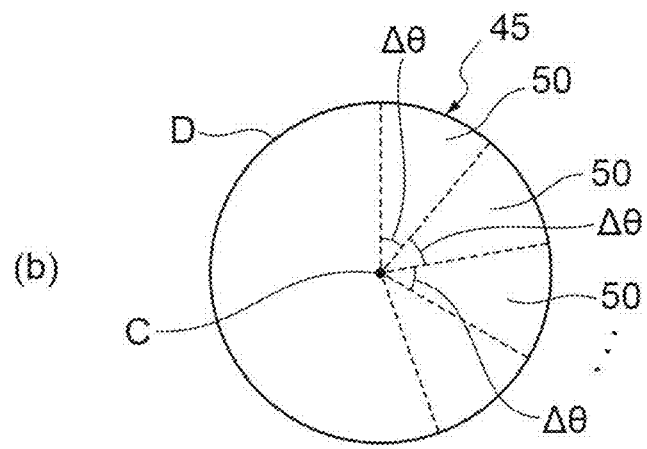
Figure 4:
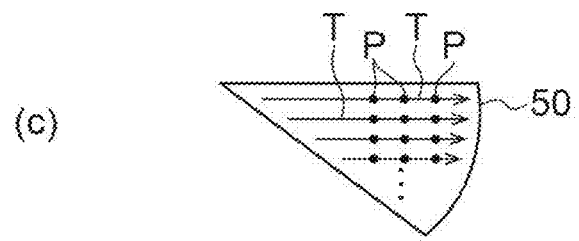

The controller 40 includes a data acquisition unit 41, a region setting unit 42, an irradiation position setting unit 43, and a rotation speed adjusting unit 44. As illustrated in FIG. 4(a), the data acquisition unit 41 acquires slice data D of a cross section of the modeled object M. The cross section of the modeled object M intersects the rotation axis C in the modeled object M. In the present disclosure, the cross section of the modeled object M is orthogonal to the rotation axis C in the modeled object M. That is, the cross section of the modeled object M is a horizontal cross section. The data acquisition unit 41 acquires the slice data D of the modeled object M by using 3D computer-aided design (CAD) data of the modeled object M. Even though FIG. 4(a) illustrates the case where the modeled object M is a cylindrical body, the modeled object M may have other shapes. The data acquisition unit 41 acquires a plurality of pieces of slice data D according to vertical positions of the modeled object M. The slice data D for one layer corresponds to the powder material A for one layer.

As illustrated in FIG. 4(b), the region setting unit 42 sets an irradiation region 45 irradiated with the electron beam on the main surface 12a of the table 12. In FIG. 4(b), a horizontal cross section of the modeled object M included in the slice data D for one layer is illustrated in a direction in which the rotation axis C extends. The irradiation region 45 is the entire region that can be irradiated with the electron beam on the main surface 12a of the table 12. The irradiation region 45 corresponds to the horizontal cross section of the modeled object M included in the slice data D. The region setting unit 42 sets the irradiation region 45 for a plurality of pieces of slice data D. In the example illustrated in FIG. 4(b), the irradiation region 45 is illustrated as a circular region centered on the rotation axis C.

The region setting unit 42 divides the irradiation region 45 into a plurality of divided regions 50 in the circumferential direction centered on the rotation axis C. In the example illustrated in FIG. 4(b), the shape of the plurality of divided regions 50 is a fan shape centered on the rotation axis C. For example, central angles $\Delta\theta$ of the divided regions 50 are mutually the same values. Each of the central angles $\Delta\theta$ of the plurality of divided regions 50 is smaller than, for example, half of a maximum central angle $\Delta\theta_F$ of the divided regions 50 that fits in a modeling area F illustrated in FIG. 5.

The modeling area F is, for example, a circular region. The beam source 33 can irradiate the modeling area F with an electron beam. When the maximum central angle $\Delta\theta_F$ of the divided regions 50 that fits in the modeling area F is 60 degrees, the central angle $\Delta\theta$ of the divided regions 50 is smaller than 30 degrees. By setting the central angle $\Delta\theta$ in this way, when the divided regions 50 are in rotary motion due to rotation of the table 12, the modeling process on the divided regions 50 can be completed while the divided regions 50 pass through the modeling area F. In other words, it is possible to prevent the divided regions 50 from passing through the modeling area F before the modeling process on the divided regions 50 is completed.

The irradiation position setting unit 43 sets an irradiation position of the electron beam for each of the divided regions 50. The irradiation position setting unit 43 sets the irradiation position of the electron beam as irradiation points P as illustrated in FIG. 4(c). The irradiation points P are disposed at predetermined intervals along trajectory data T set for each of the divided regions 50. For example, the irradiation position setting unit 43 generates data of a trajectory arranged along a certain direction as the trajectory data T. The irradiation position of the electron beam is a target for irradiating the electron beam. The irradiation position may be set according to an actual irradiation position. The irradiation position may be set as a command position for electron beam irradiation control.

FIG. 4(c) illustrates the irradiation position set as the irradiation points P along the trajectory data T. In the example of FIG. 4(c), data of the irradiation position includes the trajectory data T and a point data group. That is, in FIG. 4(c), the irradiation points P are set at predetermined intervals on the trajectory data T. These irradiation points P are the irradiation position of the electron beam. The trajectory data T and the irradiation points P on the trajectory data T indicate the irradiation position within the divided regions 50. It should be noted that setting of the irradiation position with respect to the divided regions 50 is not limited to such a setting. That is, setting of the irradiation position with respect to the divided regions 50 is not limited to setting of the trajectory data T and the point data group. The irradiation position may be set in another setting mode as long as a desired position can be irradiated with the electron beam with respect to the divided regions 50. For example, as setting of the irradiation position, one irradiation point P may be set for one piece of trajectory data T. Alternatively, as setting of the irradiation position, only the trajectory data T may be set. In this case, the electron beam is irradiated to perform scan along the trajectory data T.

The rotation speed adjusting unit 44 adjusts the rotation speed of the table 12 for each of the divided regions 50. That is, the rotation speed adjusting unit 44 sets the rotation speed of the table 12 for each of the divided regions 50. A specific method of setting the rotation speed by the rotation speed adjusting unit 44 will be described below with reference to FIGS. 6 and 7.

Figure 6:
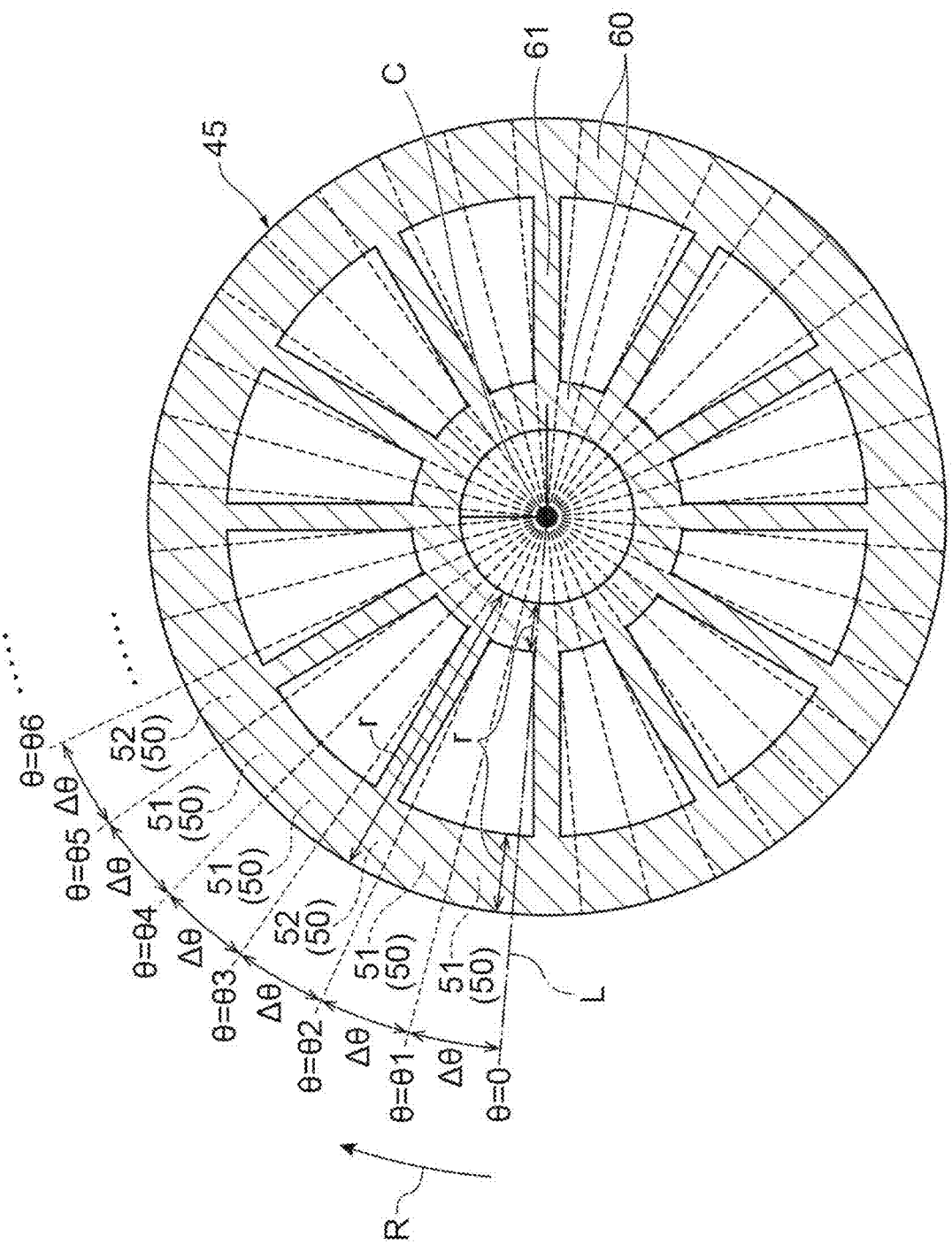
FIG. 6 is a diagram for description of an area of a divided region set by the controller of FIG. 3.
Figure 7:
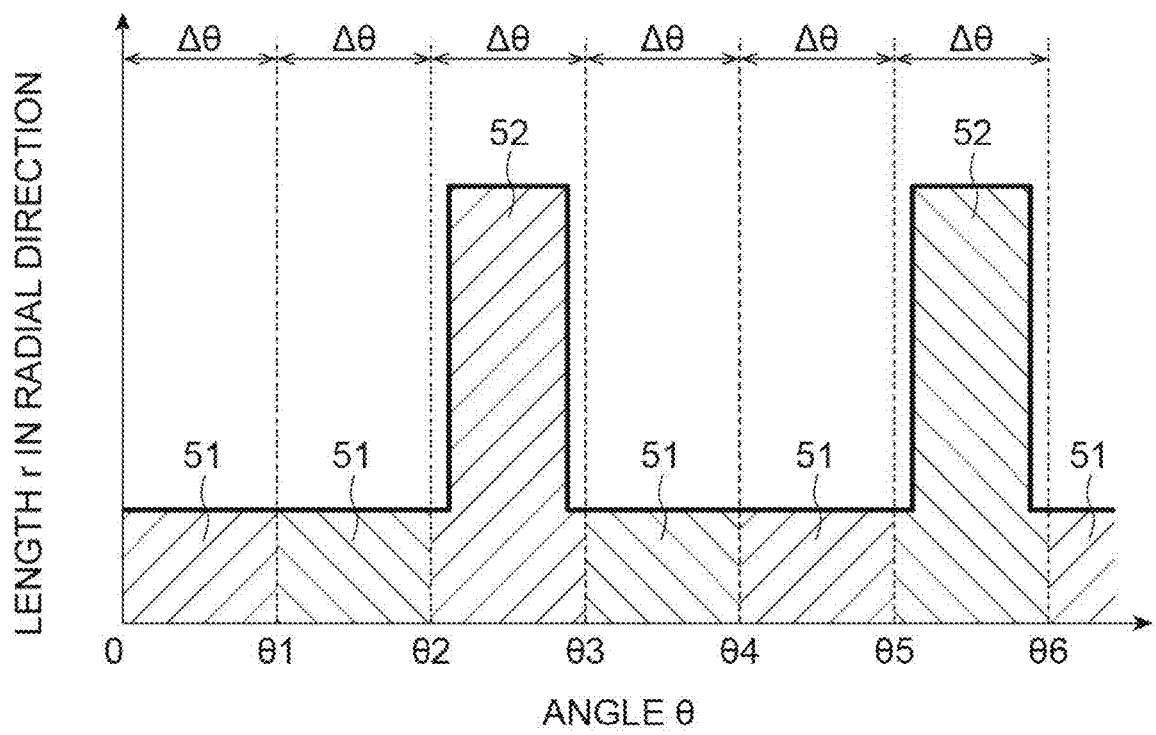
FIG. 7(a) is a graph for description of the area of a divided region of FIG. 6.
FIG. 7(b) is a graph for description of a relationship between the area of the divided region of FIG. 6 and a rotation speed of a table.
Figure 7:
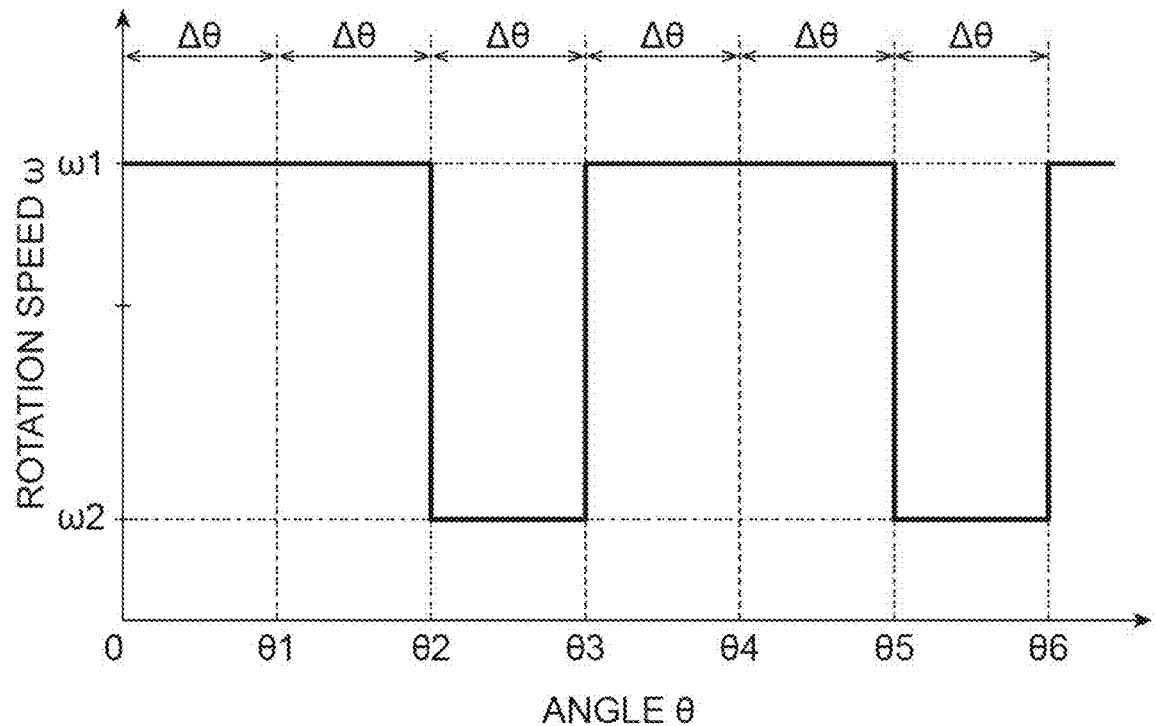

FIG. 6 is a diagram illustrating the divided regions 50 in detail. In FIG. 6, the modeled object M is illustrated as a wheel using the rotation axis C extending in the vertical direction as a central axis. The irradiation region 45 corresponds to a cross-sectional shape when the wheel is cut in a horizontal plane. For example, the irradiation region 45 has a double annular portion 60 and a plurality of linear portions 61. The double annular portion 60 is centered on the rotation axis C. The plurality of linear portions 61 connects a plurality of annular portions of the double annular portion 60 in a radial direction. For example, the plurality of linear portions 61 is arranged at equal intervals in the circumferential direction.

The plurality of divided regions 50 is obtained by dividing the irradiation region 45 in the circumferential direction. The plurality of divided regions 50 includes a plurality of first divided regions 51 and a plurality of second divided regions 52. The plurality of first divided regions 51 and the plurality of second divided regions 52 are arranged at different positions in the circumferential direction. The second divided regions 52 include the linear portions 61. An area of each of the second divided regions 52 is larger than an area of each of the first divided regions 51. The first divided regions 51 include the double annular portion 60 other than the linear portions 61. The area of each of the first divided regions 51 is smaller than the area of each of the second divided regions 52. It should be noted that the double annular portion 60 is separately disposed in the first divided regions 51. The area of the first divided regions 51 is a total area of the separated double annular portion 60. In the following description, for convenience of description, "the respective first divided regions 51 and second divided regions 52" may be collectively referred to as "divided regions 50".

As illustrated in FIG. 6, the positions of the divided regions 50 in the circumferential direction is defined by an angle θ centered on the rotation axis C. The angle θ is set with reference to a reference line L. The reference line L is a straight line orthogonal to (or intersecting with) the rotation axis C in the irradiation region 45. In the example illustrated in FIG. 6, the reference line L is set at a position overlapping with one of dividing lines of the divided regions 50. The dividing lines are broken lines in FIG. 6. The dividing lines of the divided regions 50 are straight lines extending in the radial direction from the rotation axis C. The dividing lines indicate boundaries of the divided regions 50 in the circumferential direction. Assuming that the position of the reference line L in the rotation direction R is set to θ=0, the positions of the dividing lines of the plurality of divided regions 50 in the rotation direction R are defined as θ=θ1, θ2, θ3, . . . .

The rotation angle indicates a difference between two dividing lines adjacent to each other in the circumferential direction. The rotation angle is a central angle Δθ of the divided region 50. That is, the central angle Δθ is defined by two dividing lines of the divided region 50. The central angle Δθ may be defined as a division angle that divides the irradiation region 45 into the divided regions 50 in the circumferential direction. As described above, for example, the central angles Δθ of the plurality of divided regions 50 are mutually the same values. Therefore, a first central angle Δθ of the first divided region 51 is the same as a second central angle Δθ of the second divided region 52.

A length r of the divided region 50 in the radial direction is a value obtained by summing lengths of only portions where the divided region 50 exists, not including a portion where the divided region 50 does not exist at a certain angle θ. Therefore, as illustrated in FIG. 6, the length r of the first divided region 51 is a sum of only lengths of the plurality of annular portions of the double annular portion 60. On the other hand, the length r of the second divided region 52 is a sum of a length of the linear portion 61 and lengths of the plurality of annular portions of the double annular portion 60 at an angle θ indicating the position of the linear portion 61.

In FIG. 7(a), a horizontal axis represents the angle θ centered on the rotation axis C. A vertical axis indicates the length r of the divided region 50 in the radial direction centered on the rotation axis C. When the length r of the divided region 50 is defined as described above, the area of the divided region 50 is the product of the central angle Δθ of the divided region 50 and the length r of the divided region 50. In the present disclosure, as described above, the first central angle Δθ of the first divided region 51 and the second central angle Δθ of the second divided region 52 are the same as each other. On the other hand, as illustrated in FIG. 7(a), for example, an average value of the length r of the first divided region 51 from the angle θ=0 to the angle θ=θ1 is smaller than an average value of the length r of the second divided region 52 from the angle θ=θ2 to the angle θ=θ3. Therefore, the area per unit central angle of the first divided region 51 is smaller than the area per unit central angle of the second divided region 52.

In FIG. 7(b), a horizontal axis represents the angle θ. A vertical axis represents the rotation speed of the table 12. The rotation speed adjusting unit 44 sets the rotation speed of the table 12 for each of the divided regions 50. Specifically, the rotation speed adjusting unit 44 sets a rotation speed ω2 of the table 12 during a period of irradiating the second divided region 52 with the electron beam. On the other hand, the rotation speed adjusting unit 44 sets a rotation speed ω1 of the table 12 to be faster than the rotation speed ω2 during a period of irradiating the first divided region 51 with the electron beam.

The rotation speed of the table 12 is determined according to the area per unit central angle of the divided region 50. As the area per unit central angle of the divided region 50 increases, a time required to irradiate the area per unit central angle of the divided region 50 with the electron beam increases. The time required to irradiate the area per unit central angle of the divided region 50 with the electron beam is referred to as "unit irradiation time". On the other hand, as the area per unit central angle of the divided region 50 decreases, the unit irradiation time decreases. When the unit irradiation time is long, it is necessary to slow down the rotation speed of the table 12 in order to complete irradiation of the electron beam to all the portions of the divided region 50. However, when the unit irradiation time is short, irradiation of the electron beam to all the portions of the divided region 50 can be completed even when the rotation speed of the table 12 is increased. Therefore, the rotation speed of the table 12 can be increased for the divided region 50 having a small area per unit central angle. It should be noted that a relationship between the area per unit central angle and the rotation speed is not particularly limited as long as the above relationship is followed. For example, it is assumed that the area per unit central angle of the first divided region 51 is ½ of the area per unit central angle of the second divided region 52. In this case, the rotation speed of the table 12 in the first divided region 51 may be twice the rotation speed of the table 12 in the second divided region 52.

As described above, the area per unit central angle of the first divided region 51 is smaller than the area per unit central angle of the second divided region 52. Therefore, the unit irradiation time of the first divided region 51 is shorter than the unit irradiation time of the second divided region 52. Therefore, the rotation speed ω1 in the period of irradiating the first divided region 51 with the electron beam is faster than the rotation speed ω2 in the period of irradiating the second divided region 52 with the electron beam.

The 3D manufacturing apparatus 1 of the present disclosure changes the rotation speed of the table 12 according to the area per unit central angle of the divided region 50. It should be noted that in the present disclosure, the plurality of divided regions 50 include the first divided regions 51 and the second divided regions 52. However, the plurality of divided regions 50 may have other divided regions in addition to the first divided regions 51 and the second divided regions 52. In this case, any two divided regions may be selected from these divided regions to define one of the divided regions whose area per unit central angle is small as the first divided region and define the other one of the divided regions whose area per unit central angle is large as the second divided region.

Next, a processing procedure in the controller 40 will be described. First, the controller 40 executes a data reading process. The controller 40 reads 3D CAD data of the modeled object M. Next, the data acquisition unit 41 acquires slice data D from the 3D CAD data (see FIG. 4(a)). In this instance, the data acquisition unit 41 acquires a plurality of pieces of slice data D according to a vertical position of the modeled object M.

Next, the region setting unit 42 sets the irradiation region 45 to be irradiated with the electron beam on the main surface 12a of the table 12 for an n-th layer of the modeled object M (see FIG. 4(b)). It should be noted that "n" in the n-th layer is a natural number. For example, in the downward direction, a first layer, a second layer, a third layer, . . . may be set. Then, the region setting unit 42 divides the irradiation region 45 into the plurality of divided regions 50 in the circumferential direction centered on the rotation axis C. The central angles Δθ at which the irradiation region 45 is divided into the divided regions 50 in the circumferential direction are set to, for example, the same values.

Next, the irradiation position setting unit 43 sets the irradiation position of the electron beam for each of the divided regions 50. The irradiation position setting unit 43 sets irradiation positions of the electron beam as irradiation points P (see FIG. 4(c)). The irradiation points P are arranged at predetermined intervals along the trajectory data T set for each of the divided regions 50. For example, the irradiation position setting unit 43 generates data of a trajectory arranged along a certain direction as the trajectory data T. Here, the divided regions 50 move as the table 12 rotates. Therefore, the irradiation position setting unit 43 may correct the trajectory data T in order to irradiate the electron beam along the divided regions 50. For example, the irradiation position setting unit 43 may use corrected trajectory data T as a curved trajectory.

Next, the rotation speed adjusting unit 44 determines the rotation speed of the table 12 for each of the divided regions 50. The area per unit central angle of the first divided region 51 is smaller than the area per unit central angle of the second divided region 52. Therefore, the unit irradiation time of the first divided region 51 is shorter than the unit irradiation time of the second divided region 52. Therefore, as illustrated in FIG. 7(b), the rotation speed adjusting unit 44 sets the rotation speed ω1 in the period of irradiating the first divided region 51 with the electron beam to be faster than the rotation speed ω2 in the period of irradiating the second divided region 52 with the electron beam.

Next, a description will be given of an operation during modeling in the 3D manufacturing apparatus 1. In FIG. 1, the controller 40 controls the linear drive unit 22. As a result, the table 12 moves upward. As a result of moving upward, the table 12 is disposed in the upper part of the modeling tank 13. Further, the controller 40 controls the rotary drive unit 21. As a result, the table 12 rotates about the rotation axis C. The rotation speed of the table 12 is set by the rotation speed adjusting unit 44. As described above, the rotation speed adjusting unit 44 sets the rotation speed ω2 of the table 12 during the period of irradiating the second divided region 52 with the electron beam. In the period of irradiating the first divided region 51 with the electron beam, the rotation speed ω1 of the table 12 is set to be faster than the rotation speed ω2.

Next, the controller 40 controls the feeder 31. As a result, the powder material A is supplied onto the table 12. The powder material A on the table 12 is leveled by a recoater. The powder material A supplied by the feeder 31 moves as the table 12 rotates. As a result, the powder material A enters a region below the heater 32. The heater 32 preheats the powder material A disposed below the heater 32. The powder material A is heated while moving as the table 12 rotates.

The powder material A preheated by the heater 32 moves as the table 12 rotates. As a result, the powder material A approaches the beam source 33 in the circumferential direction of the table 12. The controller 40 controls the beam source 33. As a result, the powder material A existing in the irradiation range of the beam source 33 is irradiated with the electron beam. Specifically, the beam source 33 irradiates the electron beam for each of the divided regions 50 existing within the irradiation range of the beam source 33. The divided regions 50 rotate around the rotation axis C as the table 12 rotates. The powder material A on the plurality of divided regions 50 is sequentially irradiated with the electron beam. As a result, the modeled object M is modeled for each of the divided regions 50.

Figure 5:
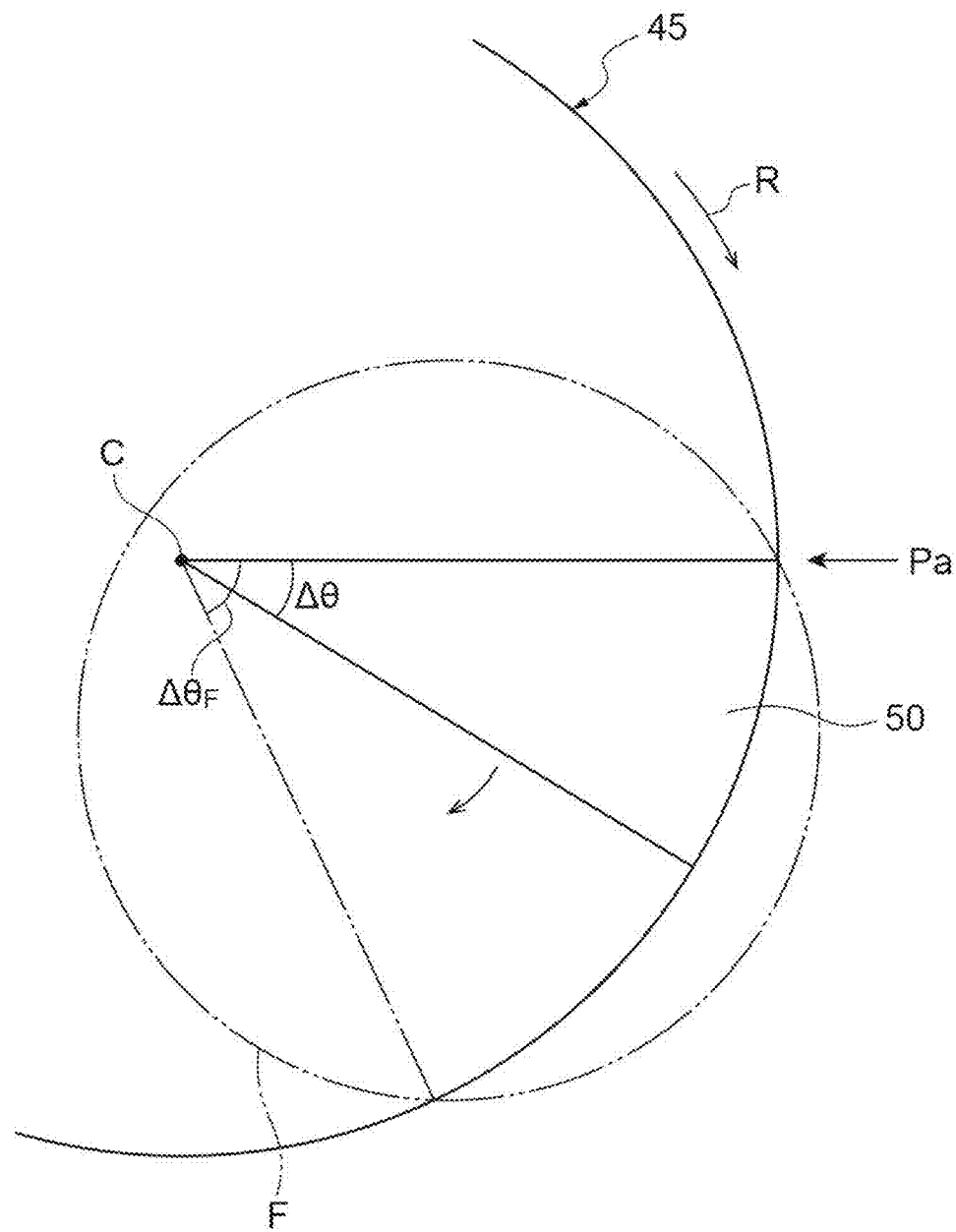
FIG. 5 is a diagram for description of limitation of a central angle of a divided region set by the controller of FIG. 3.

In this instance, for example, a start position Pa for modeling in the divided regions 50 may be set as illustrated in FIG. 5. The start position Pa is a fixed position corresponding to an installation position of the beam source 33. The start position Pa is a position when the entire one divided region 50 fits within the modeling area F. That is, when the entire one divided region 50 enters the modeling area F, the beam source 33 may start modeling the divided region 50.

The table 12 descends as the modeling of the modeled object M progresses. That is, the controller 40 controls the linear drive unit 22. As a result, the table 12 descends along the rotation axis C. The descent of the table 12 may be synchronized with the rotation of the table 12. The descent of the table 12 does not have to be perfectly synchronized with the rotation of the table 12. When modeling for all the layers is completed, the modeling of the modeled object M is completed.

The actions and effects obtained by the 3D manufacturing apparatus 1 according to the present disclosure described above will be described. In the 3D manufacturing apparatus 1, while the table 12 rotates in the rotation direction R about the rotation axis C, the powder material A on the main surface 12a of the table 12 is sequentially irradiated with an electron beam for each of the divided regions 50. Here, the area per unit central angle of the first divided region 51 is smaller than the area per unit central angle of the second divided region 52. Therefore, the unit irradiation time of the first divided region 51 is shorter than the unit irradiation time of the second divided region 52.

Therefore, when the rotation speed of the table 12 is set to a constant value based on a time required for the electron beam to the second divided region 52, a waiting time occurs after irradiation of the electron beam to the first divided region 51 is completed before irradiation of the electron beam to the first divided region 51 or the second divided region 52 is started. On the other hand, in the 3D manufacturing apparatus 1, the rotation speed ω1 of the table 12 during the period of irradiating the first divided region 51 with the electron beam is faster than the rotation speed ω2 of the table 12 during the period of irradiating the second divided region 52 with the electron beam. In this way, by increasing the rotation speed ω1 of the table 12 when irradiating the first divided region 51 with the electron beam, the above-mentioned waiting time can be reduced. Therefore, the modeling time of the modeled object M can be shortened.

Even though the 3D manufacturing apparatus 1 of the present disclosure has been described as described above, the 3D manufacturing apparatus 1 of the present disclosure is not limited to the above description. The 3D manufacturing apparatus 1 of the present disclosure can take various modifications within a range that does not deviate from the spirit and scope of the claims.

Figure 8:
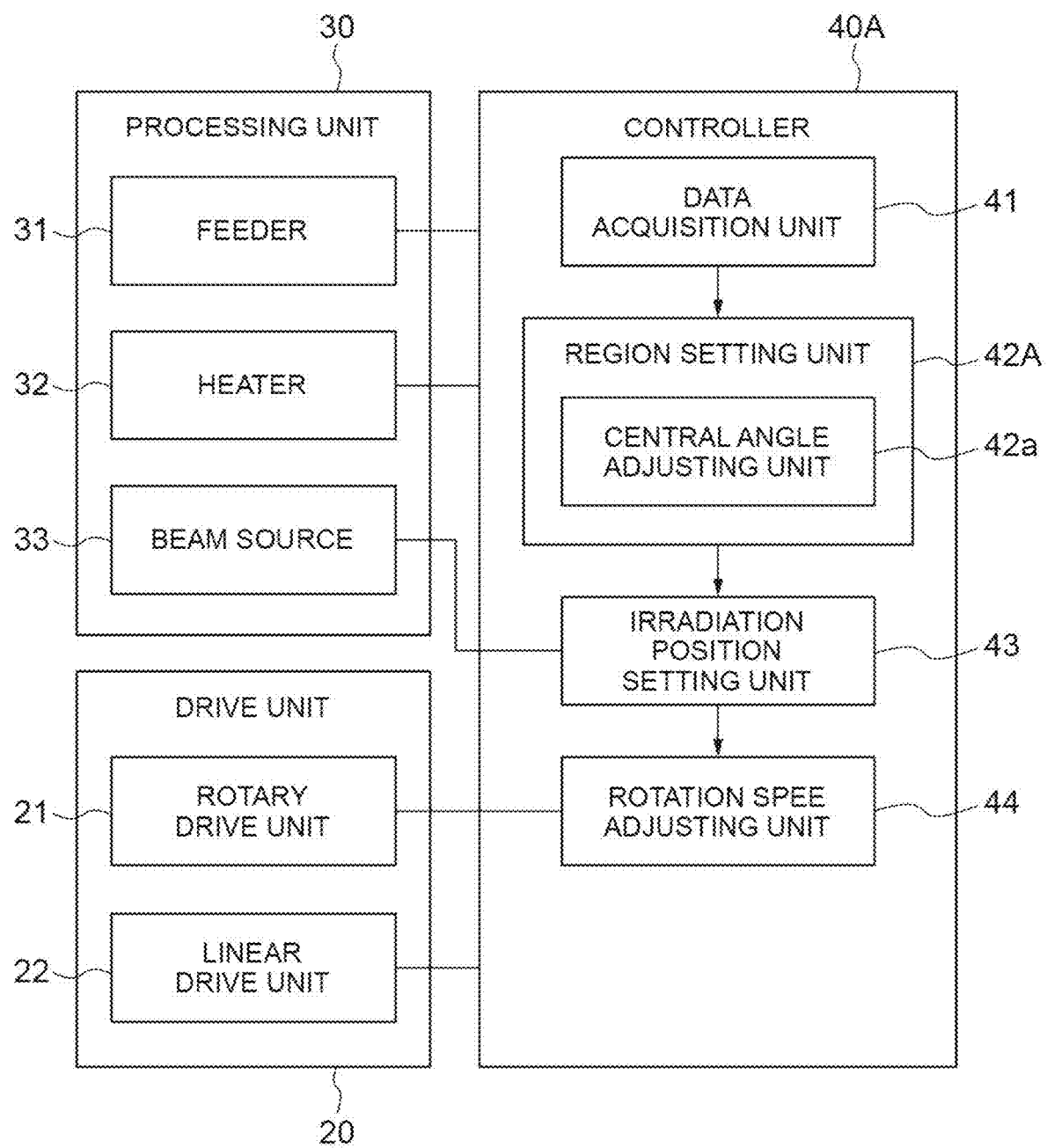
FIG. 8 is a block diagram illustrating a configuration of a controller included in a three-dimensional manufacturing apparatus according to a first modification.

FIG. 8 illustrates a configuration of a controller 40A of a 3D manufacturing apparatus according to a first modification. A region setting unit 42A of the controller 40A of this modification includes a central angle adjusting unit 42a. The central angle adjusting unit 42a adjusts central angles of a plurality of divided regions 50A. Specifically, as illustrated in FIG. 9, the central angle adjusting unit 42a sets a first central angle $\Delta\theta1$ of a first divided region 511 and a second central angle $\Delta\theta2$ of a second divided region 512 to different values.

The first divided region 511 corresponds to the first divided region 51 (see FIG. 6) before adjustment by the central angle adjusting unit 42a. The second divided region 512 corresponds to the second divided region 52 (see FIG. 6) before adjustment by the central angle adjusting unit 42a. Assuming that the position of the reference line L in the rotation direction R is $\theta=0$, positions of dividing lines of the plurality of divided regions 50A in the rotation direction R are defined as $\theta=\theta11, \theta12, \theta13, \ldots$.

Figure 9:
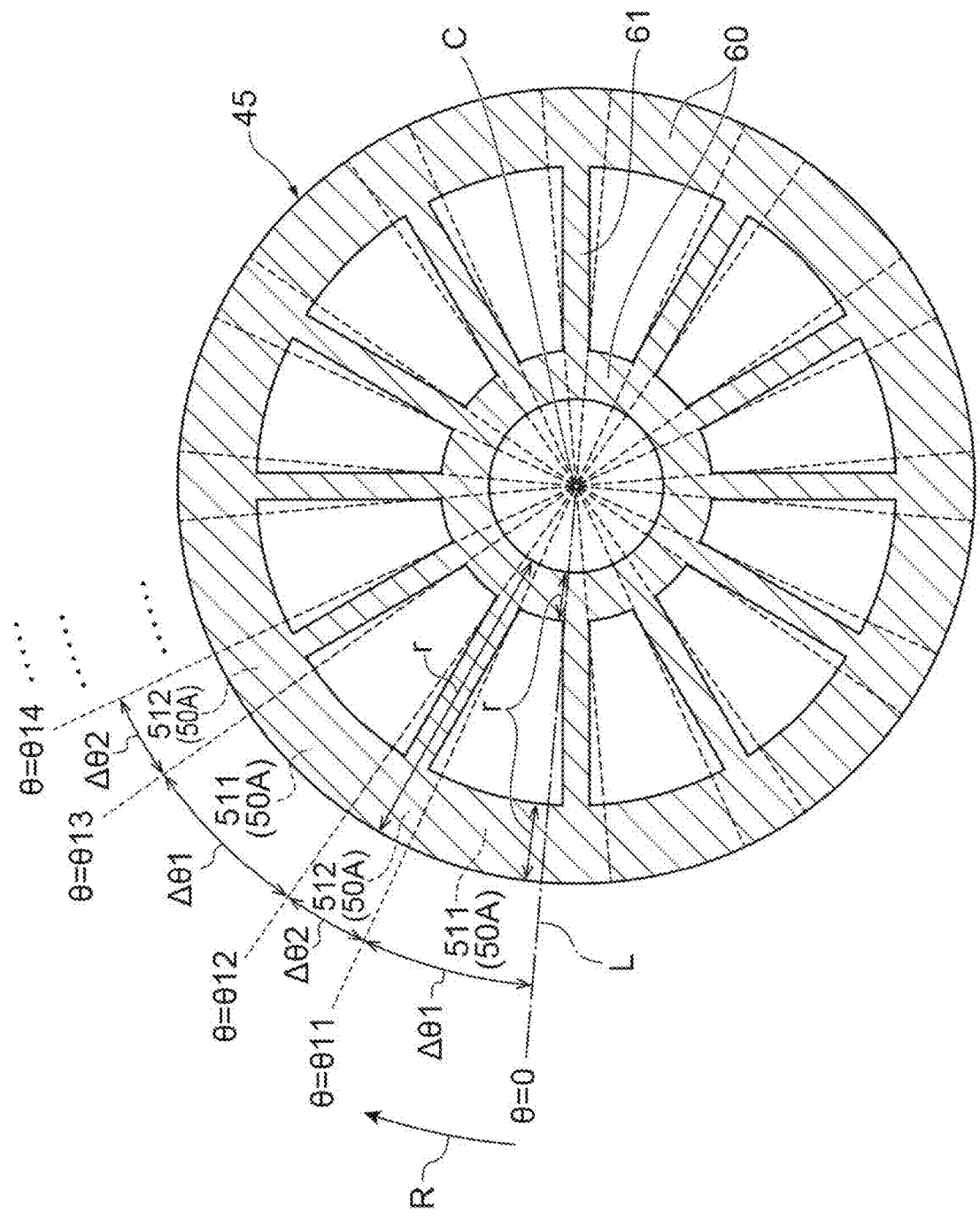
FIG. 9 is a diagram for description of an area of a divided region set by the controller of FIG. 8.

As illustrated in FIG. 9, the central angle adjusting unit 42a performs setting so that the first central angle $\Delta\theta1$ of the first divided region 511 after adjustment becomes larger than the first central angle $\Delta\theta$ of the first divided region 51 before adjustment. Further, the central angle adjusting unit 42a performs setting so that the second central angle $\Delta\theta2$ of the second divided region 512 after adjustment becomes smaller than the second central angle $\Delta\theta$ of the second divided region 52 before adjustment. The second central angle $\Delta\theta2$ of the second divided region 512 is set so that the area of the double annular portion 60 other than the linear portion 61 in the second divided region 52 is further reduced. The first central angle $\Delta\theta1$ of the first divided region 511 is set to include two first divided regions 51 adjacent to each other. The first central angle $\Delta\theta1$ of the first divided region 511 is set to be larger than the second central angle $\Delta\theta2$ of the second divided region 512.

Figure 10:
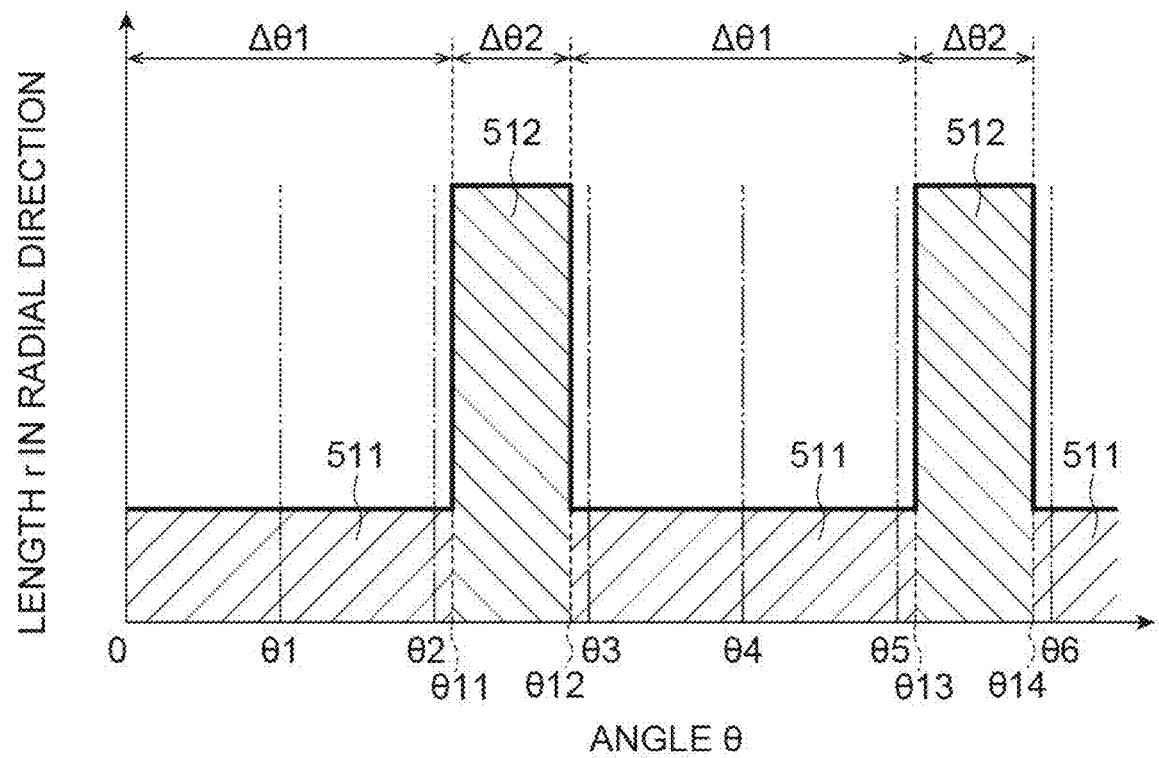
FIG. 10(a) is a graph for description of the area of the divided region of FIG. 9.
FIG. 10(b) is a graph for description of a relationship between the area of the divided region of FIG. 9 and a rotation speed of a table.
Figure 10:
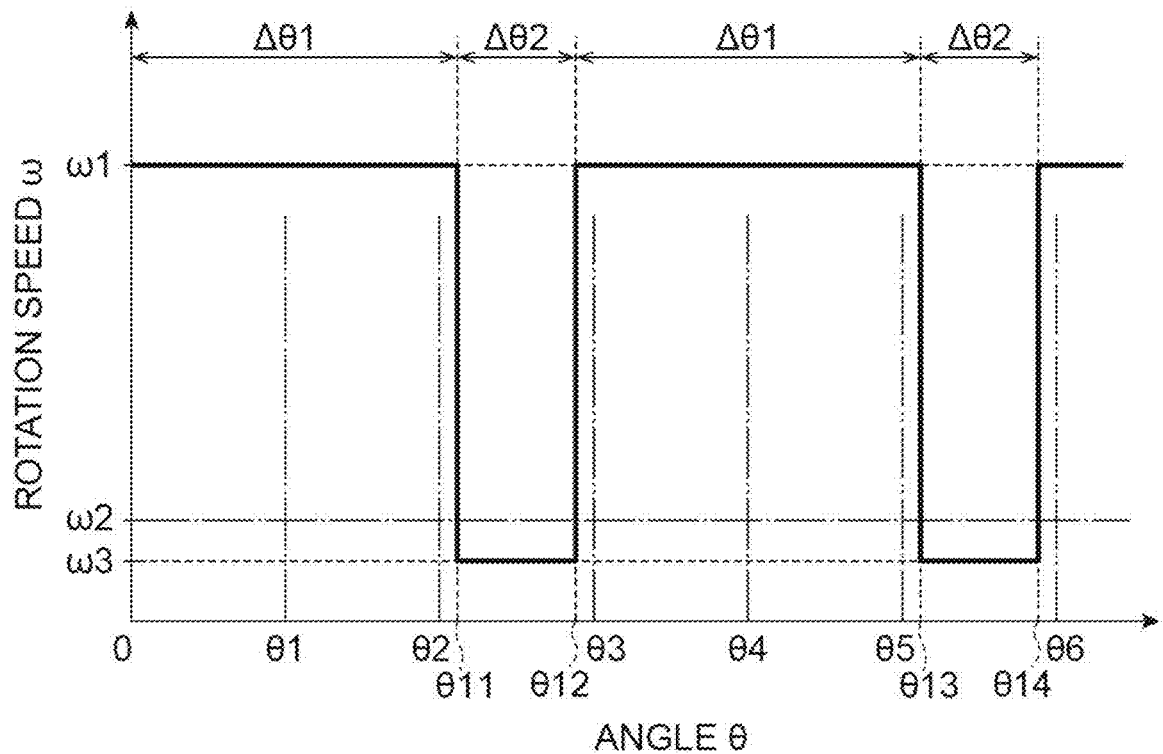

In FIG. 10(a), a horizontal axis represents the angle $\theta$ centered on the rotation axis C. A vertical axis represents a length r of an irradiation region in the radial direction centered on the rotation axis C. It should be noted that in FIG. 10(a), dividing lines of the first divided region 51 and the second divided region 52 before adjustment are indicated by two-dot chain lines. As is clear from FIG. 10(a), the total area of the first divided region 511 becomes larger than the total area of the first divided region 51 before adjustment by an increased amount of the first central angle $\Delta\theta1$ of the first divided region 511. However, a radial length r of the first divided region 511 is the same as a radial length r of the first divided region 51. Therefore, the area per unit central angle of the first divided region 511 is the same as the area per unit central angle of the first divided region 51. Therefore, the unit irradiation time of the first divided region 511 is the same as the unit irradiation time of the first divided region 51.

On the other hand, the total area of the second divided region 512 becomes smaller than the total area of the second divided region 52 before adjustment by a decreased amount of the second central angle $\Delta\theta2$ of the second divided region 512. However, for example, the average value of the length r of the second divided region 512 from the angle $\theta=\theta11$ to the angle $\theta=\theta12$ is slightly smaller than the average value of the length r of the second divided region 52 from the angle $\theta=\theta2$ to the angle $\theta=\theta3$. Therefore, the area per unit central angle of the second divided region 512 is slightly smaller than the area per unit central angle of the second divided region 52. Therefore, the unit irradiation time of the second divided region 512 is slightly longer than the unit irradiation time of the second divided region 52.

In FIG. 10(b), a horizontal axis represents the angle $\theta$. A vertical axis represents the rotation speed of the table 12. It should be noted that in FIG. 10(b), dividing lines of the first divided region 51 and the second divided region 52 before adjustment are indicated by alternate long and short dash lines. The rotation speed $\omega2$ of the table 12 during the period of irradiating the second divided region 52 with the electron beam before adjustment is indicted by a chain line. As illustrated in FIG. 10(b), the rotation speed $\omega1$ of the table 12 is set during the period of irradiating the first divided region 511 with the electron beam. The rotation speed $\omega3$ of the table 12 is set during the period of irradiating the second divided region 512 with the electron beam. As described above, the unit irradiation time of the second divided region 512 is slightly longer than the unit irradiation time of the second divided region 52. Therefore, the rotation speed $\omega3$ is slightly slower than the rotation speed $\omega2$.

However, in this modification, the first central angle $\Delta\theta1$ of the first divided region 511 is increased by a decreased amount of the second central angle $\Delta\theta2$ of the second divided region 512. Therefore, a proportion of the second divided region 512 in the irradiation region 45 becomes small. On the other hand, a proportion of the first divided region 511 in the irradiation region 45 becomes large. In this way, by increasing the proportion of the first divided region 51 in which the rotation speed $\omega1$ of the table 12 is high, a time required for the table 12 to make one rotation can be shortened. That is, it is possible to modulate the area per unit central angle of the first divided region 511 and the area per unit central angle of the second divided region 512. For example, the controller 40 of the embodiment causes a section from the angle $\theta2$ to the angle $\theta11$ illustrated in FIG. 10 to be included in a section which is the rotation speed $\omega2$. That is, a rotation speed of the section from the angle $\theta2$ to the angle $\theta11$ in which modeling can be originally performed at the rotation speed $\omega1$ is the rotation speed $\omega2$, which is slower than the rotation speed $\omega1$. Meanwhile, the controller 40A of this modification causes the section from the angle $\theta2$ to the angle $\theta11$ to be included in the first divided region 511 by adjusting the central angle. As a result, it is possible to rotate at the rotation speed $\omega1$ in the section from the angle $\theta2$ to the angle $\theta11$. That is, it is possible to increase a proportion of the first divided region 51 that can rotate at a high speed, and to attempt optimization of a modeling speed. Therefore, according to this modification, it is possible to further shorten the modeling time of the modeled object M.

In this modification, the region setting unit 42A includes the central angle adjusting unit 42a. However, the region setting unit 42A does not have to include the central angle adjusting unit 42a. In this case, an external device provided outside the 3D manufacturing apparatus may include the central angle adjusting unit 42a. Data acquired by the data acquisition unit 41 from the external device may include data related to the first divided region 511 and data related to the second divided region 512. Further, in this modification, the first central angle $\Delta\theta$ of the first divided region 511 is increased. The first central angle $\Delta\theta1$ of the first divided region 511 should not be larger than half of the maximum central angle $\Delta\theta_F$ of the first divided region 511 that fits within the modeling area F (see FIG. 5). As a result, the first central angle $\Delta\theta1$ of the first divided region 511 is limited to a certain size. Even when the first central angle $\Delta\theta1$ of the first divided region 511 is limited in this way, the molding time of the modeled object M is further shortened by adjusting the rotation speed $\omega1$ during the period of irradiating the first divided region 511 with the electron beam.

Figure 11:
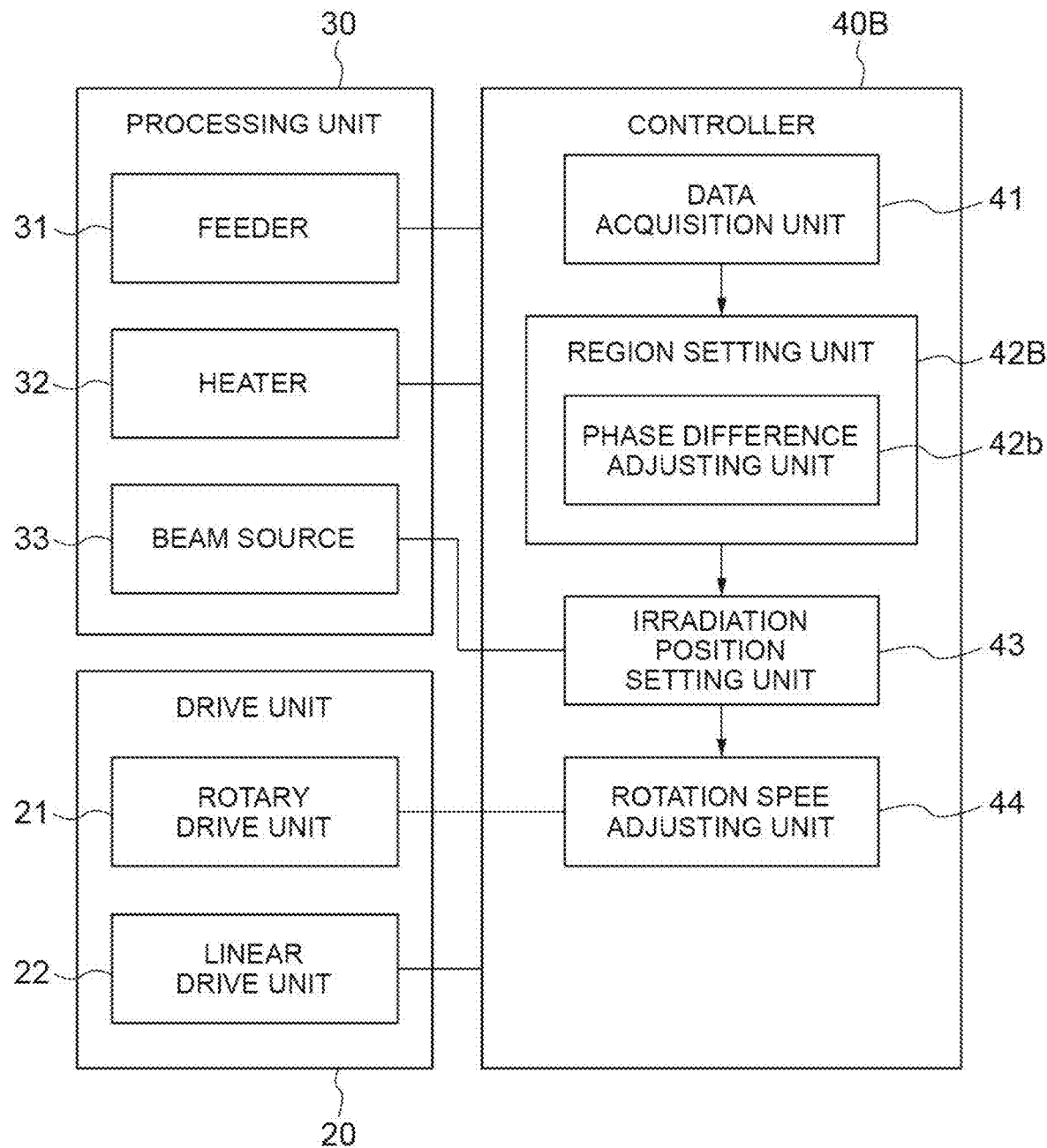
FIG. 11 is a block diagram illustrating a configuration of a controller included in a three-dimensional manufacturing apparatus according to a second modification.
Figure 12:
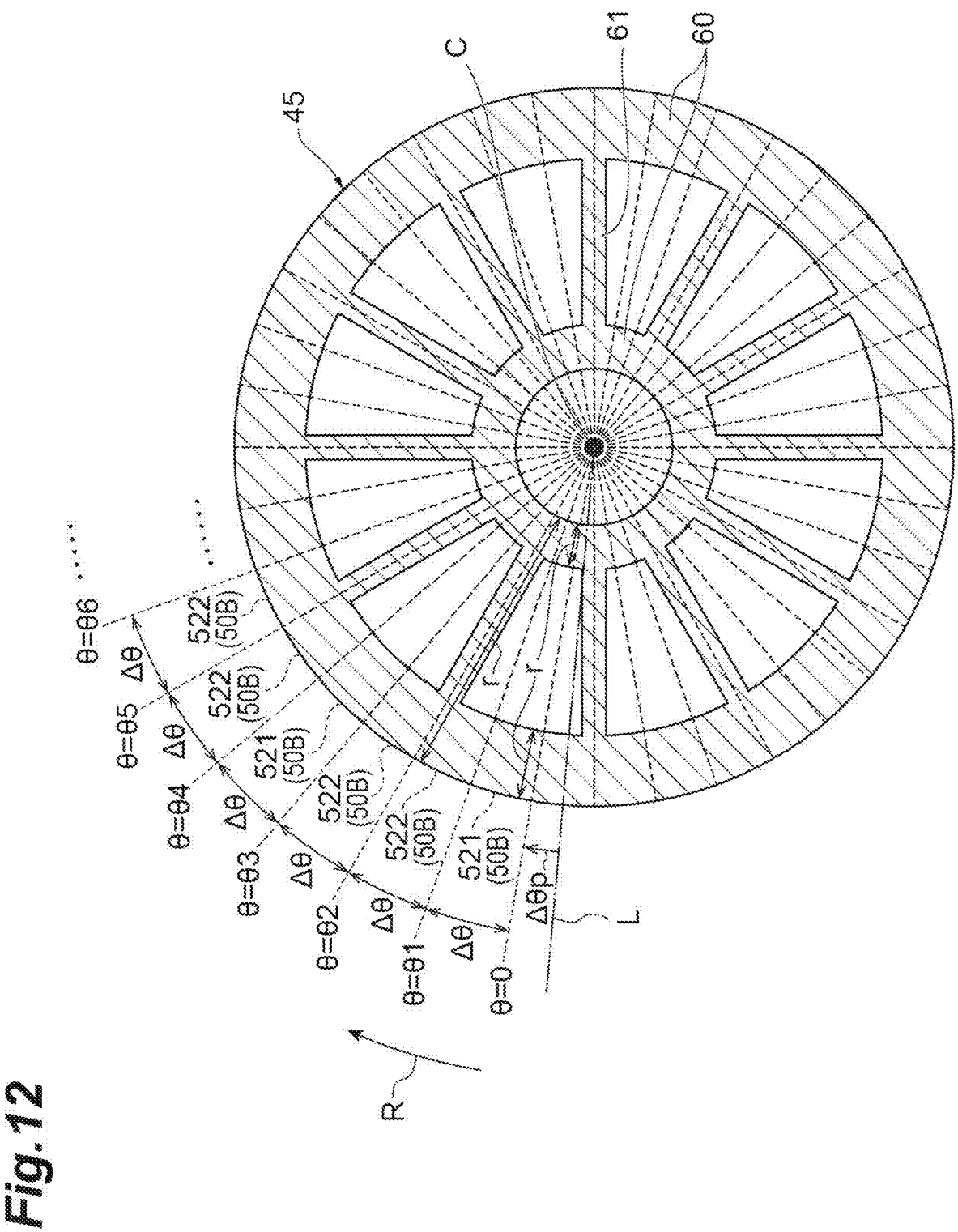
FIG. 12 is a diagram for description of an area of a divided region set by the controller of FIG. 11.

FIG. 11 illustrates a configuration of a controller 40B of a 3D manufacturing apparatus according to a second modification. A region setting unit 42B of the controller 40B of this modification includes a phase difference adjusting unit 42b. As illustrated in FIG. 12, the phase difference adjusting unit 42b adjusts phase differences of a plurality of divided regions 50B. A phase difference of a divided region 50B is a rotation angle indicating a difference in the circumferential direction between a reference line L and a dividing line indicating a boundary of the divided region 50B in the circumferential direction. The reference line L is set at a position overlapping the dividing line of the first divided region 51 before adjustment (see FIG. 6) by the phase difference adjusting unit 42b. The phase difference adjusting unit 42b sets a phase difference of the divided region 50B after adjustment and a phase difference of the divided region 50B before adjustment to different values.

For example, the phase difference adjusting unit 42b performs adjustment so that the phase difference of the divided region 50B after adjustment is larger than the phase difference of the divided region 50 before adjustment. Specifically, the phase difference adjusting unit 42b increases the phase difference of the divided region 50B after adjustment by a phase difference Δθp in the rotation direction R with respect to the phase difference of the divided region 50 before adjustment. By adjusting the phase difference using the phase difference adjusting unit 42b, the dividing line of the divided region 50B is located at a center of the linear portion 61 in the circumferential direction. Each of two divided regions 50B sharing the dividing line that bisects the linear portion 61 becomes the second divided region 522. Even after the phase difference is adjusted by the phase difference adjusting unit 42b, the divided region 50B not including the linear portion 61 becomes the first divided region 521.

Among two second divided regions 522 adjacent to each other in the circumferential direction, the second divided region 522 far from the reference line corresponds to the second divided region 52 before adjustment (see FIG. 6). The second divided region 522 near the reference line corresponds to the first divided region 51 before adjustment. Further, the first divided region 521 corresponds to the first divided region 51 before adjustment. Before and after the adjustment by the phase difference adjusting unit 42b, the central angles Δθ of the plurality of divided regions 50B are the same. Assuming that a position shifted from the reference line L in the rotation direction R by the phase difference Δθp is set to θ=0, positions of dividing lines of the plurality of divided regions 50B in the rotation direction R are defined as θ=θ1, θ2, θ3, . . . .

Figure 13:
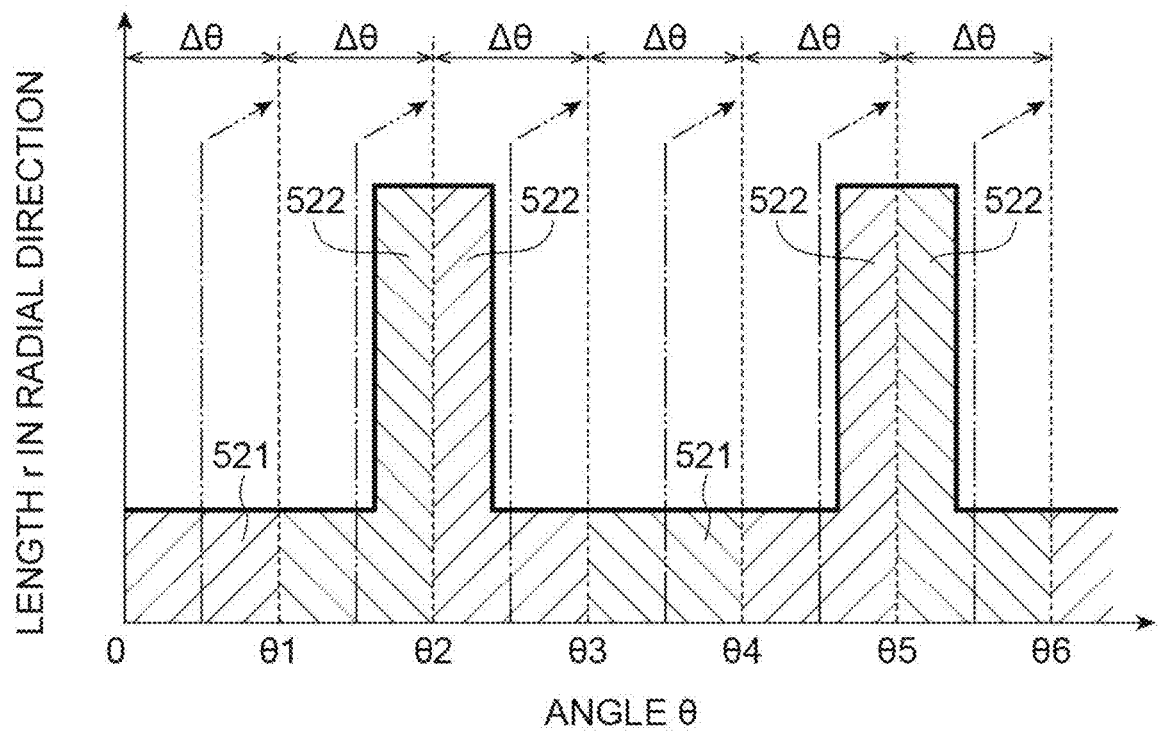
FIG. 13(a) is a graph for description of the area of the divided region of FIG. 12.
FIG. 13(b) is a graph for description of a relationship between the area of the divided region of FIG. 12 and a rotation speed of a table.
Figure 13:
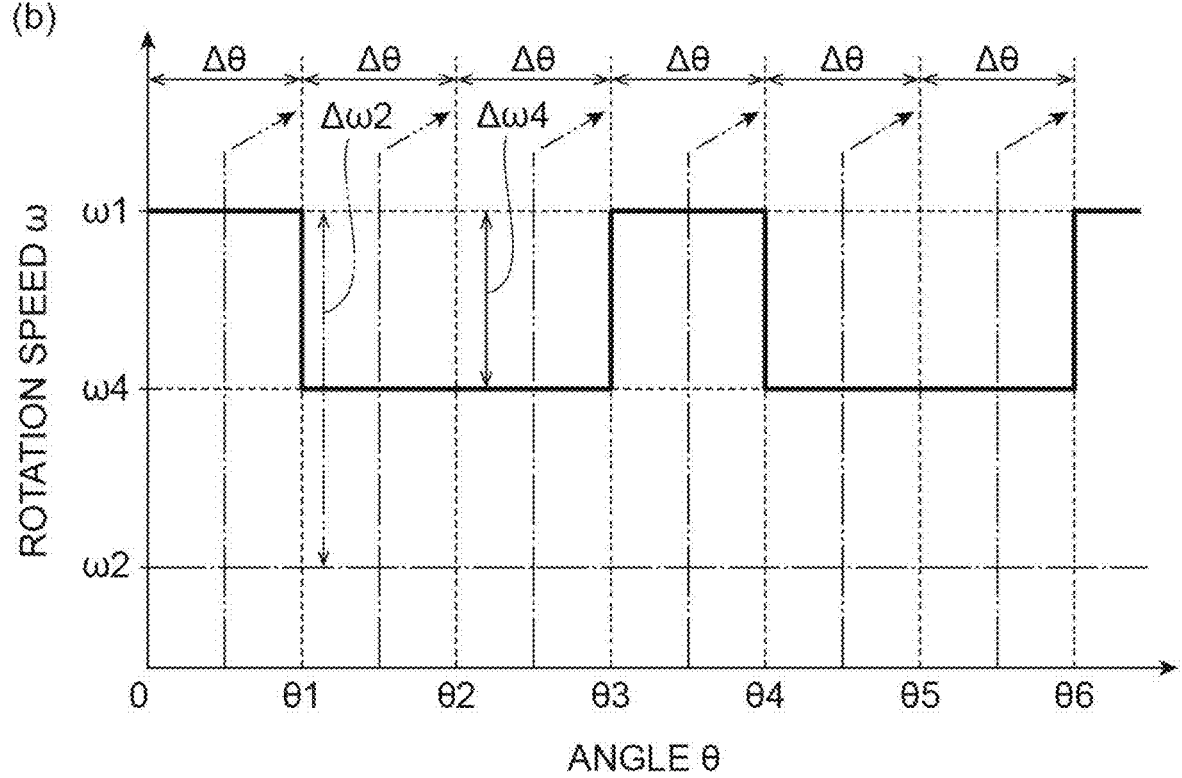

In FIG. 13(a), a horizontal axis represents the angle θ centered on the rotation axis C. A vertical axis represents the length r of the irradiation region in the radial direction centered on the rotation axis C. It should be noted that in FIG. 13(a), dividing lines of the first divided region 51 and the second divided region 52 before adjustment are indicated by two-dot chain lines. As illustrated in FIG. 13(a), the area per unit central angle of the first divided region 521 after adjustment is the same as the area per unit central angle of the first divided region 51 before adjustment. Therefore, the unit irradiation time of the first divided region 521 is the same as the unit irradiation time of the first divided region 51. On the other hand, for example, the average value of the length r of the second divided region 522 from the angle θ=θ2 to the angle θ=θ3 is smaller than the average value of the length r of the second divided region 52 from the angle θ=θ2 to the angle θ=θ3 before adjustment. The area per unit central angle of the second divided region 522 is smaller than the area per unit central angle of the second divided region 52 before adjustment. Therefore, the unit irradiation time of the second divided region 522 is shorter than the unit irradiation time of the second divided region 52.

In FIG. 13(b), a horizontal axis represents the angle θ. A vertical axis represents the rotation speed of the table 12. It should be noted that in FIG. 13(b), dividing lines of the first divided region 51 and the second divided region 52 before adjustment are indicated by two-dot chain lines. The rotation speed ω2 of the table 12 during the period of irradiating the second divided region 52 with the electron beam before adjustment is indicated by a chain line. As illustrated in FIG. 13(b), the rotation speed ω1 of the table 12 is set during the period of irradiating the first divided region 511 with the electron beam. The rotation speed ω4 of the table 12 is set during the period of irradiating the second divided region 512 with the electron beam. The unit irradiation time of the second divided region 522 is shorter than the unit irradiation time of the second divided region 52. Therefore, the rotation speed ω4 in the period of irradiating the second divided region 522 with the electron beam is faster than the rotation speed ω2 in the period of irradiating the second divided region 52 with the electron beam.

According to this modification, the area per unit central angle of the second divided region 522 can be reduced by adjusting the phase differences of the plurality of divided regions 50B using the phase difference adjusting unit 42b. Accordingly, the unit irradiation time of the second divided region 522 can be shortened. As a result, the rotation speed ω4 of the table 12 with respect to the second divided region 522 can be increased, so that the modeling time of the modeled object M can be further shortened.

According to this modification, the controller 40B adjusts a phase difference so that a difference (ratio) between the area per unit central angle of the first divided region 521 and the area per unit central angle of the second divided region 522 becomes small. The area is related to the rotation speed. Therefore, as the difference in area becomes smaller, the difference in rotation speed becomes smaller. That is, the rotation speed ω4 becomes faster. As a result, the rotation speed ω4 can be made close to the rotation speed ω1. That is, as illustrated in FIG. 13(b), a difference Δω4 between the rotation speed ω4 and the rotation speed ω1 can be made smaller than a difference Δω2 between the rotation speed ω2 and the rotation speed ω1. In this way, the rotation speeds ω1 and ω4 of the table 12 can be easily kept within a permissible range of the rotation speed of the table 12, so that stability of the rotation speed of the table 12 can be improved.

The present disclosure can be modified in various other ways. For example, the embodiment and the plurality of modifications may be combined with each other according to the required purpose and effect. Further, the configuration of the 3D manufacturing apparatus 1 may be changed as appropriate. For example, in the embodiment and the plurality of modifications, the controller 40 of the 3D manufacturing apparatus may include a data generation unit that generates the slice data D instead of the data acquisition unit 41 that acquires the slice data D.

In the embodiment and the plurality of modifications, a description has been given of the 3D manufacturing apparatus 1 including one feeder 31, one heater 32, and one beam source 33. However, the 3D manufacturing apparatus may include a plurality of feeders, a plurality of heaters, and a plurality of beam sources. For example, the 3D manufacturing apparatus may include two feeders, two heaters, and two beam sources. In this case, the powder material can be supplied, the powder material can be preheated, and beam irradiation can be performed on one side of a half of the table. In parallel with this operation, the powder material can be supplied, the powder material can be preheated, and beam irradiation can be performed on the other side of the half of the table. Therefore, the modeled object can be modeled more efficiently. Further, the 3D manufacturing apparatus may include three or more feeders, three or more heaters, and three or more beam sources.

In addition, in the embodiment and the plurality of modifications, a description has been given of the case where the 3D manufacturing apparatus models the modeled object M using the electron beam as an energy beam. However, the 3D manufacturing apparatus may model the modeled object using an energy beam other than the electron beam. For example, the 3D manufacturing apparatus may irradiate an ion beam, a laser beam, ultraviolet rays, etc. to model the modeled object. Further, the 3D manufacturing apparatus may model the modeled object using a method other than the powder bed method.

REFERENCE SIGNS LIST

1: 3D manufacturing apparatus, 12: table, 12a: main surface, 20: drive unit, 21: rotary drive unit, 22: linear drive unit, 30: processing unit, 31: feeder, 32: heater, 33: beam source (irradiation unit), 40, 40A, 40B: controller, 41: data acquisition unit, 42, 42A, 42B: region setting unit, 42a: central angle adjusting unit, 42b: phase difference adjusting unit, 43: irradiation position setting unit, 44: rotation speed adjusting unit, 45: irradiation region, 50, 50A, 50B: divided region, 51, 511, 521: first divided region, 52, 512, 522: second divided region, A: powder material, C: rotation axis, L: reference line, M: modeled object, R: rotation direction, $\Delta\theta$, $\Delta\theta 1$: first central angle, $\Delta\theta$, $\Delta\theta 2$: second central angle, $\Delta\theta p$: phase difference, ($\omega 1$, $\omega 2$, $\omega 3$, $\omega 4$: rotation speed.

The invention claimed is:

1. A three-dimensional manufacturing apparatus which models a three-dimensional modeled object by irradiating a powder material supplied onto a main surface of a table with an energy beam, the three-dimensional manufacturing apparatus comprising: a rotary drive unit configured to rotate the table about a rotation axis in a circumferential direction; a region setting unit configured to set a plurality of divided regions obtained by dividing, in the circumferential direction, an irradiation region of the energy beam on a main surface of the table, the irradiation region corresponding to a cross section of the modeled object intersecting the rotation axis, wherein an area per unit central angle of one first divided region among the plurality of divided regions is smaller than an area per unit central angle of one second divided region among the plurality of divided regions; an irradiation unit that faces the main surface of the table and is configured to irradiate the powder material with the energy beam for each of the divided regions; and a rotation speed adjusting unit configured to adjust a rotation speed of the table so that a rotation speed of the table during a period of irradiating the one first divided region with the energy beam becomes faster than a rotation speed of the table during a period of irradiating the one second divided region with the energy beam.

2. The three-dimensional manufacturing apparatus according to claim 1, wherein a first central angle of the one first divided region and a second central angle of the one second divided region are different values.

3. The three-dimensional manufacturing apparatus according to claim 1,
wherein the region setting unit includes a phase difference adjusting unit that adjusts a phase difference which is a rotation angle indicating a difference between a reference line intersecting the rotation axis on the main surface of the table and a dividing line defining a central angle of the one second divided region in the circumferential direction, the phase difference adjusting unit sets the phase difference of the one second divided region after adjustment to a different value from a value of the phase difference of the one second divided region before adjustment, and a central angle of the one second divided region is the same value before and after adjustment by the phase difference adjusting unit.

4. The three-dimensional manufacturing apparatus according to claim 2,
wherein the region setting unit includes a phase difference adjusting unit that adjusts a phase difference which is a rotation angle indicating a difference between a reference line intersecting the rotation axis on the main surface of the table and a dividing line defining a central angle of the second divided region in the circumferential direction,
the phase difference adjusting unit sets the phase difference of the second divided region after adjustment to a different value from a value of the phase difference of the second divided region before adjustment, and
a central angle of the second divided region is the same value before and after adjustment by the phase difference adjusting unit.

* * * * *